US010358517B2

(12) United States Patent
Berzinis et al.

(10) Patent No.: US 10,358,517 B2
(45) Date of Patent: *Jul. 23, 2019

(54) AMPHIPHILIC BLOCK COPOLYMER; COMPOSITION, MEMBRANE, AND SEPARATION MODULE THEREOF; AND METHODS OF MAKING SAME

(71) Applicant: SABIC GLOBAL TECHNOLOGIES B.V., Bergen op Zoom (NL)

(72) Inventors: Albin Peter Berzinis, Delmar, NY (US); Pooja Bajaj, Schenectady, NY (US); Rachel Elizabeth Halbfinger, Glenville, NY (US); Matias Bikel, Bergen op Zoom (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/303,561

(22) PCT Filed: Apr. 30, 2015

(86) PCT No.: PCT/US2015/028520
§ 371 (c)(1),
(2) Date: Oct. 12, 2016

(87) PCT Pub. No.: WO2015/168409
PCT Pub. Date: Nov. 5, 2015

(65) Prior Publication Data
US 2017/0037177 A1 Feb. 9, 2017

Related U.S. Application Data

(60) Provisional application No. 61/987,158, filed on May 1, 2014.

(51) Int. Cl.
| | | |
|---|---|---|
| C08F 283/08 | (2006.01) |
| C08L 71/12 | (2006.01) |
| C08G 65/48 | (2006.01) |
| B01D 61/14 | (2006.01) |
| B01D 67/00 | (2006.01) |
| B01D 71/52 | (2006.01) |

(52) U.S. Cl.
CPC ......... C08F 283/08 (2013.01); B01D 61/14 (2013.01); B01D 67/0009 (2013.01); B01D 67/0095 (2013.01); B01D 71/52 (2013.01); C08G 65/485 (2013.01); C08L 71/12 (2013.01); C08L 71/126 (2013.01); B01D 2325/022 (2013.01); B01D 2325/38 (2013.01); C08G 2261/128 (2013.01); C08L 2205/05 (2013.01)

(58) Field of Classification Search
CPC . C08F 283/08; C08G 65/485; C08G 2261/00; C08L 71/12; C08L 71/126; C08L 2205/05
See application file for complete search history.

(56) References Cited

U.S. PATENT DOCUMENTS

| | | | |
|---|---|---|---|
| 3,446,856 A | | 3/1969 | Hamilton |
| 3,522,326 A | | 7/1970 | Bostick et al. |
| 3,703,564 A | | 11/1972 | White |
| 3,770,699 A | * | 11/1973 | White .................. C08G 63/668 525/394 |
| 3,970,640 A | | 7/1976 | Yonemitsu et al. |
| 4,201,880 A | | 5/1980 | Van Sorge |
| 4,277,344 A | | 7/1981 | Cadotte |
| 4,278,777 A | * | 7/1981 | Jakabhazy ............ C08F 259/00 525/244 |
| 4,338,421 A | | 7/1982 | Maruyama et al. |
| 4,454,284 A | | 6/1984 | Ueno et al. |
| 4,622,206 A | | 11/1986 | Torgeson |
| 4,882,168 A | | 11/1989 | Casey et al. |
| 4,933,081 A | | 6/1990 | Sasaki et al. |
| 4,944,775 A | | 7/1990 | Hayes |

(Continued)

FOREIGN PATENT DOCUMENTS

| | | |
|---|---|---|
| CN | 103007787 A | 4/2013 |
| CN | 103170259 B | 12/2014 |

(Continued)

OTHER PUBLICATIONS

Non-Final Office Action for U.S. Appl. No. 15/303,562; dated Feb. 6, 2018.
Machine Translation for JPH011322921A.
Advisory Action dated Aug. 8, 2017 for U.S. Appl. No. 15/536,836; 4 Pages.
International Preliminary Report on Patentability for International Application No. PCT/US2016/028951; Date of Filing: Apr. 22, 2016; dated Aug. 7, 2017; 57 pages.
Machine Translation for JPH08143699.
Machine Translation for JPS46006542.
Machine Translation for JPS62152507A.

(Continued)

*Primary Examiner* — Kara B Boyle
(74) *Attorney, Agent, or Firm* — Cantor Colburn LLP

(57) ABSTRACT

An amphiphilic block copolymer comprises a poly(phenylene ether) block or a poly(phenylene ether) copolymer block and a hydrophilic block or graft. A method of making the amphiphilic block copolymer comprises polymerization of a hydrophilic ethylenically unsaturated monomer in the presence of poly(phenylene ether) or a poly(phenylene ether) copolymer to make the amphiphilic block copolymer. A porous asymmetric membrane comprises a poly(phenylene ether) or poly(phenylene ether) copolymer, and the amphiphilic block copolymer comprising a poly(phenylene ether) block or a poly(phenylene ether) copolymer block, and a hydrophilic block or graft. The porous asymmetric membrane is made by phase-inversion of a dope solution of the poly(phenylene ether) or poly(phenylene ether) copolymer and the amphiphilic block copolymer in a coagulation bath.

21 Claims, 2 Drawing Sheets

(56) References Cited

U.S. PATENT DOCUMENTS

| | | | |
|---|---|---|---|
| 5,069,793 A | 12/1991 | Kaschemekat et al. | |
| 5,118,327 A | 6/1992 | Nelson et al. | |
| 5,128,421 A | 7/1992 | Ohmura et al. | |
| 5,132,363 A | 7/1992 | Furuta et al. | |
| 5,159,027 A | 10/1992 | Kanayama et al. | |
| 5,209,849 A | 5/1993 | Hu et al. | |
| 5,282,964 A | 2/1994 | Young et al. | |
| 5,385,976 A | 1/1995 | Furuta et al. | |
| 5,480,552 A | 1/1996 | Soltys et al. | |
| 5,527,467 A | 6/1996 | Oftshun et al. | |
| 5,643,968 A | 7/1997 | Andreola et al. | |
| 5,795,920 A | 8/1998 | Kang et al. | |
| 5,834,583 A | 11/1998 | Hancock et al. | |
| 6,294,499 B1 | 9/2001 | Watson et al. | |
| 6,437,084 B1 | 8/2002 | Birsak et al. | |
| 6,472,499 B1 | 10/2002 | Braat et al. | |
| 7,166,148 B2 | 1/2007 | Lyons et al. | |
| 7,208,438 B2 | 4/2007 | Ingelbrecht et al. | |
| 8,222,342 B2 | 7/2012 | Weber et al. | |
| 8,287,735 B2 | 10/2012 | Hanemaaijer et al. | |
| 8,302,781 B2 | 11/2012 | Wechs et al. | |
| 8,505,745 B2 | 8/2013 | Mayes et al. | |
| 8,602,221 B2 | 12/2013 | Mizomoto et al. | |
| 8,727,136 B2 | 5/2014 | Ansorge et al. | |
| 8,741,600 B2 | 6/2014 | Yamaguchi et al. | |
| 9,133,338 B2 | 9/2015 | Yang et al. | |
| 2004/0145127 A1 | 7/2004 | Pinto | |
| 2004/0149127 A1 | 8/2004 | Lyons et al. | |
| 2004/0231663 A1 | 11/2004 | Carter et al. | |
| 2005/0218057 A1 | 10/2005 | Ngee | |
| 2006/0076884 A1 | 4/2006 | Ahn | |
| 2006/0076885 A1 | 4/2006 | Kim et al. | |
| 2006/0137522 A1 | 6/2006 | Nishimura et al. | |
| 2007/0068871 A1 | 3/2007 | Flynn | |
| 2007/0202374 A1 | 8/2007 | Bridges et al. | |
| 2007/0238832 A1 | 10/2007 | Borade et al. | |
| 2008/0076884 A1 | 3/2008 | Yeager et al. | |
| 2008/0076885 A1 | 3/2008 | Yeager et al. | |
| 2008/0085989 A1 | 4/2008 | Yeager et al. | |
| 2008/0142429 A1 | 6/2008 | Zhang et al. | |
| 2008/0203012 A1 | 8/2008 | Yeager et al. | |
| 2008/0207822 A1 | 8/2008 | Yeager et al. | |
| 2008/0312349 A1* | 12/2008 | Yeager | B01D 67/0009 521/27 |
| 2009/0018303 A1 | 1/2009 | Onizuka et al. | |
| 2010/0244306 A1 | 9/2010 | Tang | |
| 2012/0100904 A1 | 4/2012 | Frick et al. | |
| 2012/0103904 A1 | 5/2012 | Morita et al. | |
| 2012/0277347 A1 | 11/2012 | Bedner et al. | |
| 2012/0305486 A1 | 12/2012 | Storr et al. | |
| 2013/0220924 A1 | 8/2013 | Maeda | |
| 2016/0008528 A1 | 1/2016 | Roy et al. | |
| 2016/0021191 A1 | 1/2016 | Wang et al. | |
| 2016/0022892 A1 | 1/2016 | Eifler et al. | |
| 2016/0079616 A1 | 3/2016 | Lee et al. | |
| 2017/0282131 A1 | 10/2017 | Berzinis et al. | |
| 2018/0079863 A1 | 3/2018 | Ghanta | |

FOREIGN PATENT DOCUMENTS

| | | |
|---|---|---|
| EP | 0216633 | 4/1987 |
| EP | 0568045 A1 | 11/1993 |
| EP | 0083489 B1 | 4/1999 |
| EP | 1918019 A1 | 5/2008 |
| EP | 2535101 A1 | 12/2012 |
| JP | S42004276 B | 2/1964 |
| JP | S46002837 B | 10/1967 |
| JP | S46006542 | 12/1971 |
| JP | S60114323 A | 6/1985 |
| JP | S62057915 | 3/1987 |
| JP | S62071503 A | 4/1987 |
| JP | S62152507 A | 7/1987 |
| JP | S63100916 A | 5/1988 |
| JP | S63128021 A | 5/1988 |
| JP | S63197502 | 8/1988 |
| JP | S63218231 A | 9/1988 |
| JP | S63230173 A | 9/1988 |
| JP | H03065227 A | 3/1991 |
| JP | H04011927 | 1/1992 |
| JP | H08143699 A | 6/1996 |
| JP | S64030621 | 2/1999 |
| JP | H11156165 A | 6/1999 |
| JP | H11322921 A | 11/1999 |
| JP | 2000246064 A | 9/2000 |
| JP | 2004231743 A | 8/2004 |
| JP | 2005262211 A | 9/2005 |
| JP | 2013013838 A | 1/2013 |
| JP | 2014205761 A | 10/2014 |
| WO | 0240140 A1 | 5/2002 |
| WO | 03000389 A2 | 1/2003 |
| WO | 2004056459 A1 | 7/2004 |
| WO | 2005107929 A2 | 11/2005 |
| WO | WO2008/036454 | 3/2008 |
| WO | 2008103599 A2 | 8/2008 |
| WO | 2012008837 A2 | 1/2012 |
| WO | 2013131848 A1 | 9/2013 |
| WO | 2014195234 A1 | 12/2014 |
| WO | 2015168392 A1 | 11/2015 |
| WO | 2015168414 A1 | 11/2015 |
| WO | 2015168423 A1 | 11/2015 |
| WO | 2015168584 A1 | 11/2015 |
| WO | 2015168592 A1 | 11/2015 |
| WO | 2015168418 A1 | 11/2016 |
| WO | 2016178835 A1 | 11/2016 |

OTHER PUBLICATIONS

Non-Final Office Action dated Jan. 4, 2018 for U.S. Appl. No. 15/536,836; 11 Pages.

U.S. Notice of Allowance, U.S. Appl. No. 15/356,854, dated Aug. 16, 2017, 16 pages.

Written Opnion of the International Searching Authority for International Application No. PCT/US2016/028951; Date of Filing: Apr. 22, 2016; dated Apr. 11, 2017; 10 pages.

CN 103170259; Machine Translation; Date of Publication: Dec. 10, 2014; 10 pages.

Final Office Action dated Jun. 7, 2017; U.S. Appl. No. 15/356,836, filed Nov. 21, 2016; 16 pages.

International Search Report for International Application No. PCT/US2016/028951; International Filing Date Apr. 22, 2016; dated Jul. 29, 2016; 7 pages.

International Search Report for International Application No. PCT/US2017/022061; Date of Filing: Mar. 13, 2017; dated Jul. 4, 2017; 6 pages.

International Search Report for International Application No. PCT/US2017/022088; Date of Filing: Mar. 13, 2017; dated Jun. 28, 2017; 6 pages.

JP S60114323; Machine Translation; Date of Publication: Jun. 20, 1985; 8 pages.

Loh et al.; "Fabrication of high performance polyethersulfone UF hollow fiber membranes using amphiphilic Pluronic block copolymers as pore-forming additives"; J. Membr. Sci., vol. 380; 2011; 114-123.

Non-Final Office Action dated Feb. 16, 2017; U.S. Appl. No. 15/356,836, filed Nov. 21, 2016; 24 pages.

Non-Final Office Action dated Mar. 6, 2017; U.S. Appl. No. 15/356,854, filed Nov. 21, 2016; 28 pages.

Susanto et al.; "Characteristics, performance and stability of polyethersulfone ultrafiltration membranes prepared by phase separation method using different macromolecular additives"; J. Membr. Sci., vol. 327; 2009; p. 125-35.

U.S. Appl. No. 15/356,836 to Berzinis; filed Nov. 21, 2016; 29 pages.

U.S. Appl. No. 15/356,854 to Berzinis; filed Nov. 21, 2016; 38 pages.

U.S. Appl. No. 62/155,593 to Berzinis; filed May 1, 2015; 36 pages.

Written Opinion of the International Search Report for International Application No. PCT/US2016/028951; International Filing Date Apr. 22, 2016; dated Jul. 29, 2016; 9 pages.

(56) References Cited

OTHER PUBLICATIONS

Written Opinion of the International Searching Authority for International Application No. PCT/US2017/022061; Date of Filing: Mar. 13, 2017; dated Jul. 4, 2017; 9 pages.
Written Opinion of the International Searching Authority for International Application No. PCT/US2017/022088; Date of Filing: Mar. 13, 2017; dated Jun. 28, 2017; 8 pages.
Asatekin et al.; "Anti-fouling ultrafiltration membranes containing polyacrylonitrile-graft-poly(ethylene oxide) comb copolymer additives"; Journal of Membrane Science 298 (2007) pp. 136-146.
ATRP Solutions; 2011 Catalog; 9 pages.
Baker; "Membranes and Modules"; Membrane Technology & Applications, Third Edition; 2012 John Wiley & Sons; pp. 97-178.
Bernardo et al.; "Membrane Gas Separation: A Review/State of the Art"; Ind. Eng. Chem. Res. 2009, 48, pp. 4638-4663.
Chung et al.; "Formation of ultrathin high-performance polyethersulfone hollow-fiber membranes"; Journal of Membrane Science 133 (1997) pp. 161-175.
Cooper et al.; "Preparation and Properties of Poly(arylene oxide) Copolymers"; Advances in Chemistry; American Chemical Society; 1973; pp. 230-257.
Cooper et al.; "Preparation and Properties of Polyarylene Oxide Copolymers"; 1973; pp. 551-556.
Dongliang et al.; "Polyethersulfone hollow fiber gas separation membranes prepared from NMP/alcohol solvent systems"; Journal of Membrane Science; 115; 1996, pp. 85-108.
International Search Report for International Application No. PCT/US2015/028520, International Filing Date Apr. 30, 2015, dated Aug. 13, 2015, 5 pages.
Kang et al.; "Protein antifouling mechanisms of PAN UF membranes incorporating PAN-g-PEO additive"; Journal of Membrane Science 296 (2007) pp. 42-50.
Kim et al.; "Ultrafiltration membranes prepared from blends of polyethersulfone and poly(1-vinylpyrrolidone-co-styrene) copolymers"; Journal of Membrane Science 262 (2005) pp. 60-68.
Liang et al.; "Synthesis and characterization of poly(phenylene oxide) graft copolymers by atom transfer radical polymerizations"; European Polymer Journal 45 (2009) pp. 2348-2357.
Petersen; "Composite reverse osmosis and nanofiltration membranes"; Journal of Membrane Science, 83 (1993) pp. 81-150.
Semsarzadeh et al.; "Synthesis and Characterization of Poly(phenylene oxide)-Based Block Copolymers via Cobalt Mediated Radical Polymerization (CMRP)"; Silicon; 6, 2014, pp. 27-34.
Smid et al.; "The formation of asymmetric hollow fibre membranes for gas separation, using PPE of different intrinsic viscosities"; Journal of Membrane Science, 64, 1991, pp. 121-128.
Ulbricht; "Advanced functional polymer membranes", Polymer; 47; Jan. 2006; pp. 2217-2262.
Vandezande et al.; "High throughput study of phase inversion parameters for polyimide-based SRNF membranes"; Journal of Membrane Science, 330, 2009, pp. 307-318.
Wang et al.; "Highly permeable polyethersulfone hollow fiber gas separation membranes prepared using water as non-solvent additive"; Journal of Membrane Science 176 (2000) pp. 147-158.
Wang et al.; "Polyethersulfone hollow fiber gas separation membranes prepared from NMP/alcohol solvent systems"; Journal of Membrane Science 115 (1996) pp. 85-108.
Written opinion for International Application No. PCT/US2015/028520, International Filing Date Apr. 30, 2015, dated Aug. 13, 2015, 8 pages.
Yang et al.; "Tailoring pore size and pore size distribution of kidney dialysis hollow fiber membranes via dual-bath coagulation approach"; Journal of Membrane Science 290 (2007) pp. 153-163.
Yeager et al.; "Polyethers, Aromatic"; Encyclopedia of Polymer Science and Technology; vol. 11; John Wiley & Sons; 2003; pp. 64-87.
Non-Final Office Action for U.S. Appl. No. 15/303,556; dated May 3, 2018; 30 pages.
Restriction Requirement for U.S. Appl. No. 15/302,323 dated Apr. 30, 2018; 8 pages.
Restriction Requirement for U.S. Appl. No. 15/303,058; dated May 1, 2018; 8 pages.
Restriction Requirement for U.S. Appl. No. 15/303,061; dated May 4, 2018; 8 pages.
Restriction Response for U.S. Appl. No. 15/302,276; dated Apr. 23, 2018: 8 pages.
Final Office Action for U.S. Appl. No. 15/356,836 dated Apr. 20, 2018, 22 pages.
Machine Translation for JPH08143699 obtained from Espacenet on Jan. 12, 2018, 0 pages; https://worldwide.espacenet.com/publicationDetails/biblio?ll=0&ND=3&adjacent=true&locale=en_EP&FT=D&date=19960604&CC=JP&NR=H08143699A&KC=A#).
Machine Translation for JPS4665420A obtained from J-Plat Pat on Jan. 8, 2018, 14 pages; (https://www4.j-platpat.inpit.go.jp/cgi-bin/tran_web_cgi_ejje?u=http://www4.j-platpat.inpit.go.jp/eng/translation/20180424050647402376855621217410 56C2CF07F06D8BF80DAC7BA11D51D95A0).
Machine Translation for JPS62152507A obtained from Espacenet on Jan. 12, 2018, 11 pages: (https://worldwide.espacenet.com/publicationDetails/biblio?ll=0&ND=3&adjacent=true&locale=en_EP&FT=D&date=19870707&CC=JP&NR=S62152507A&KC=A#).
The State Intellectual Property Office of the People's Republic of China Search; CN Application No. 2015800215400; International Filing Date: Apr. 30, 2015; dated Jan. 22, 2019; 2 pages.
Wang et al. "The Modern Methods and Technology of Polymer Synthesis," 2013, pp. 56, 57, 78, 79, 83, and 84, vol. 289.
Advisory Action for U.S. Appl. No. 15/356,836; dated Jul. 3, 2018; 9 Pages.
Li et al., Ed., "Water Treatment and Water Quality Control of Power Station"; China Electric Power Press; 2012; pp. 203-204.
Li et al., Ed., "Water Treatment and Water Quality Control of Power Station"; China Electric Power Press; 2012; pp. 203-204 (Original in Chinese).
Non Final Office Action for U.S. Appl. No. 15/303,061; dated Jul. 19, 2018; 53 pages.
Non-Final Office Action for U.S. Appl. No. 15/302,276; dated Jul. 19, 2018; 45 pages.
Non-Final Office Action for U.S. Appl. No. 15/302,323; dated Jul. 19, 2018; 51 pages.
Non-Final Office Action for U.S. Appl. No. 15/303,058; dated Jul. 19, 2018; 56 pages.
Notice of Allowance for U.S. Appl. No. 15/303,562; dated Jun. 1, 2018; 25 pages.
Shi et al., Ed., "Membrane Technology Manual"; Chemical Industry Press; 2001; p. 199 (Original in Chinese).
Shi et al., Ed., "Membrane Technology Manual"; Chemical Industry Press; 2001; p. 199.
Wang, Ed. "Biomedical Engineering Principles"; Science Press; 1982; p. 326 (Original in Chinese).
Wang, Ed. "Biomedical Engineering Principles"; Science Press; 1982; p. 326.
Wang, Ed., "Membrane Separation Technology and Use Thereof"; Science Press; 1994; p. 181 (Original in Chinese).
Wang, Ed., "Membrane Separation Technology and Use Thereof"; Science Press; 1994; p. 181.
Zhong et al., Ed., "Principle of Chemical Industry"; National Defense Industry Press; 2013; p. 399 (Original in Chinese).
Zhong et al., Ed., "Principle of Chemical Industry"; National Defense Industry Press; 2013; p. 399.

* cited by examiner

AMPHIPHILIC BLOCK COPOLYMER; COMPOSITION, MEMBRANE, AND SEPARATION MODULE THEREOF; AND METHODS OF MAKING SAME

CROSS REFERENCE TO RELATED APPLICATIONS

This application is a National Stage application of PCT/US2015/028520, filed Apr. 30, 2015, which claims the benefit of U.S. Provisional Application No. 61/987,158, filed May 1, 2014, both of which are incorporated by reference in their entirety herein.

BACKGROUND OF THE INVENTION

Poly(phenylene ether)s are a class of plastics having excellent water resistance, thermal resistance, and dimensional stability. They retain their mechanical strength in hot, and/or wet environments. Therefore they can be used for the fabrication of porous asymmetric membranes useful in various separation processes. For example, poly(phenylene ether)s can be used in processes that require repeated cleaning with hot water or steam sterilization. However the use of poly(phenylene ether)s in various water treatment processes can be limited because of their hydrophobicity. The membranes are not wettable by water, and a high pressure gradient is required to pass water through the membrane pores. Moreover, hydrophobic interactions between the membrane and solutes in feed streams can cause membrane fouling, which adversely affects membrane performance, and requires cleaning or membrane replacement.

The surface of membranes fabricated from hydrophobic polymers can be made hydrophilic by blending with a hydrophilic polymer. For example, polyethersulfone can be blended with poly(N-vinylpyrrolidone), and the two polymers can be co-precipitated from solution to form a membrane. However, excess poly(N-vinylpyrrolidone) must be washed off of the membrane with water, which results in a waste of valuable material, and which produces an aqueous waste comprising the excess poly(N-vinylpyrrolidone). Moreover the hydrophilic polymer can be leached out of the membrane in membrane treatment of aqueous streams. There remains a need for a polymer that provides a hydrophilic surface to porous asymmetric membranes fabricated from hydrophobic polymers. The polymer should be hydrophilic and still have an affinity for the hydrophobic polymer, so that it is not extracted by washing during fabrication or in end-use operation of the membrane.

BRIEF DESCRIPTION OF THE INVENTION

An amphiphilic block copolymer comprises, consists essentially of, or consists of a hydrophobic block comprising, consisting essentially of, or consisting of a poly(phenylene ether) block or a poly(phenylene ether) copolymer block; and a hydrophilic block or graft.

A method of making the amphiphilic block copolymer comprises polymerization of a hydrophilic ethylenically unsaturated monomer in the presence of a hydrophobic polymer comprising, consisting essentially of, or consisting of poly(phenylene ether) or a poly(phenylene ether) copolymer to make the amphiphilic block copolymer.

A porous asymmetric membrane comprises, consists essentially of, or consists of: a hydrophobic polymer comprising, consisting essentially of, or consisting of a poly(phenylene ether) or poly(phenylene ether) copolymer; and an amphiphilic block copolymer comprising a hydrophobic block comprising a poly(phenylene ether) block or a poly(phenylene ether) copolymer block; and a hydrophilic block or graft.

A method of forming the porous asymmetric membrane comprises: dissolving a hydrophobic polymer comprising, consisting essentially of, or consisting of a poly(phenylene ether) or poly(phenylene ether) copolymer and an amphiphilic block copolymer comprising a hydrophobic block comprising a poly(phenylene ether) or poly(phenylene ether) copolymer, and a hydrophilic block or graft, in a water-miscible polar aprotic solvent to form a porous asymmetric membrane-forming composition; phase-inverting the porous asymmetric membrane forming-composition in a first non-solvent to form the porous asymmetric membrane; optionally washing the porous asymmetric membrane in a second non-solvent; and optionally drying the porous asymmetric membrane to form the porous asymmetric membrane.

BRIEF DESCRIPTION OF THE DRAWINGS

Referring now to the drawings.

DETAILED DESCRIPTION OF THE INVENTION

Figure 1:
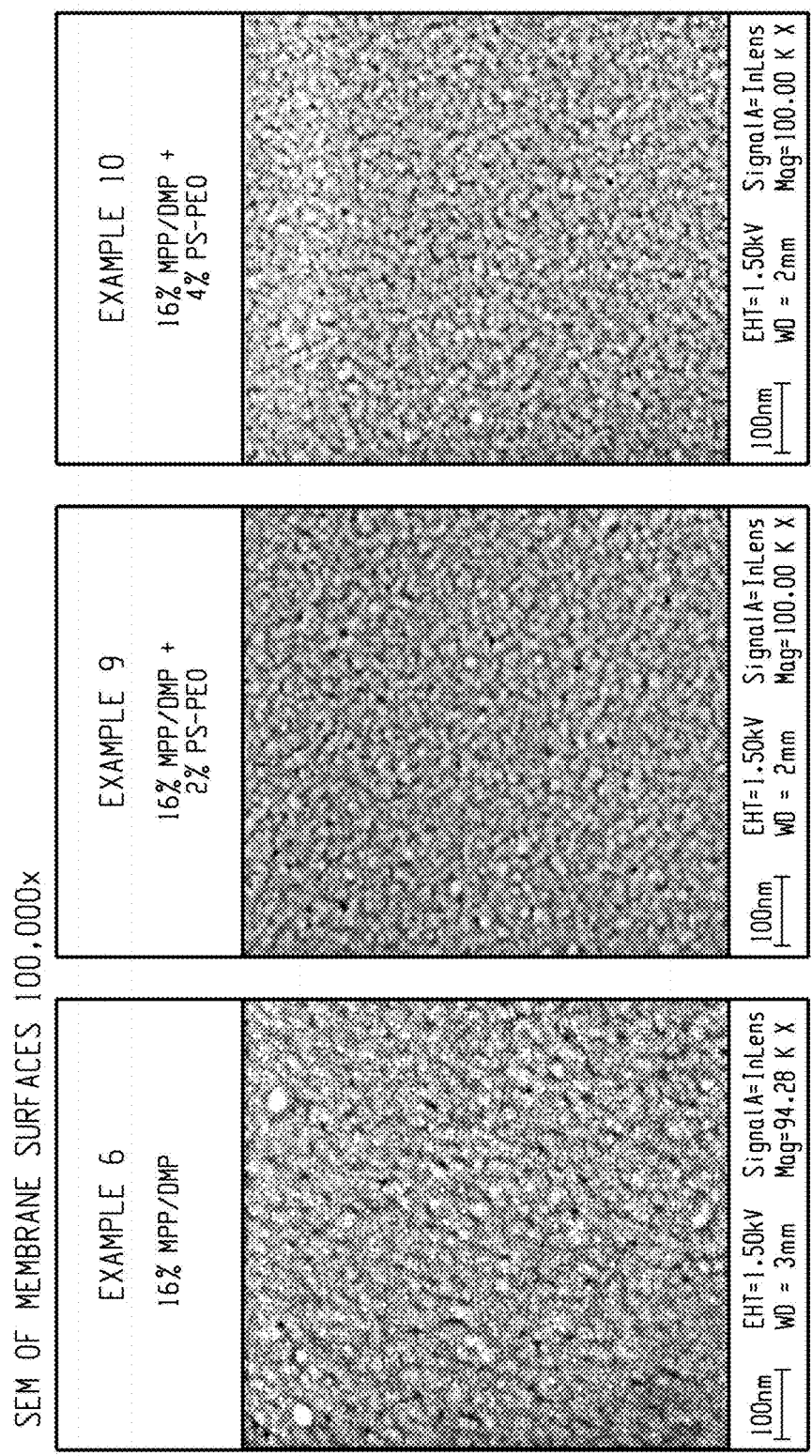
FIG. 1 depicts scanning electron microscopy (SEM) images of the porous asymmetric membrane surfaces Examples 6 and 9-10.

The inventors hereof have discovered specific amphiphilic copolymers are particularly useful in the manufacture of asymmetric membranes and hollow fibers used in ultrafiltration. The copolymers have a hydrophobic segment (a poly(phenylene ether) or copolymer thereof) that can be present in the form of blocks or a polymer backbone; and a hydrophilic segment that can be present in the form of polymer blocks or grafted to the hydrophobic backbone. The amphiphilic copolymers are used together with a poly(phenylene ether) or copolymer thereof to form the flat membranes or hollow fiber membranes.

Accordingly, an amphiphilic block copolymer comprises a hydrophobic block and a hydrophilic block or graft, wherein the hydrophobic block comprises, consists essentially of, or consists of, a poly(phenylene ether) block or a poly(phenylene ether) copolymer block. In some embodiments, the hydrophobic block or consists of a poly(phenylene ether) block or a poly(phenylene ether) copolymer block. These amphiphilic block copolymers are differentiated from random copolymers of hydrophobic ethylenically unsaturated monomers and hydrophilic ethylenically unsaturated copolymers, for example a random copolymer of styrene and N-vinylpyrrolidone, in that the hydrophobic monomer repeat units and hydrophilic monomer repeat units are localized in homopolymer blocks comprising either comonomer. In some embodiments, the amphiphilic block copolymer comprises 20 to 50 weight percent of the hydrophobic block and 80 to 50 weight percent of the hydrophilic block or graft. In other embodiments, the amphiphilic block copolymer comprises 50 to 90 weight percent of the hydrophobic block and 50 to 1 weight percent of the hydrophilic block or graft.

The hydrophobic block of the amphiphilic block copolymer can comprise a poly(phenylene ether). In some embodiments, the hydrophobic block of the amphiphilic block copolymer comprised a poly(phenylene ether) having repeat units (I):

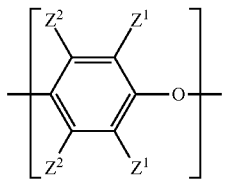

wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{112}$ hydrocarbyl provided that the hydrocarbyl group is not tertiary hydrocarbyl, $C_{-112}$ hydrocarbylthio, $C_{1-12}$ hydrocarbyloxy, or $C_{2-12}$ halohydrocarbyloxy wherein at least two carbon atoms separate the halogen and oxygen atoms. In some embodiments, the hydrophobic block comprises poly(2,6-dimethyl-1,4-phenylene ether).

The hydrophobic block of the amphiphilic block copolymer can comprise a poly(phenylene ether) copolymer block, for example a copolymer block comprising units derived from 2,6-dimethylphenol and 2,3,6-trimethylphenol. In some embodiments, the hydrophobic block of the amphiphilic block copolymer comprises a poly(phenylene ether) copolymer block comprising: 100 to 20 mole percent repeat units derived from 2,6-dimethylphenol; and 0 to 80 mole percent repeat units derived from a second monohydric phenol (II) wherein Z is $C_{1-12}$ alkyl, $C_{3-12}$ cycloalkyl, or monovalent group (III)

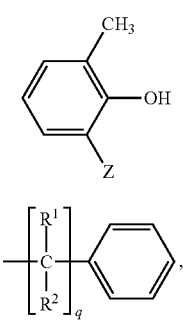

wherein in monovalent group (III), q is 0 or 1, and $R^1$ and $R^2$ are independently hydrogen or $C_{1-6}$ alkyl; wherein all mole percents are based on the total moles of all repeat units; and wherein the poly(phenylene ether) copolymer block has an intrinsic viscosity of 0.1 to 0.5 deciliters per gram, measured in chloroform at 25° C.

The hydrophobic block of the amphiphilic block copolymer can comprise repeat units derived from 2,6-dimethylphenol. In some embodiments, the hydrophobic block of the amphiphilic copolymer comprises a poly(phenylene ether) copolymer comprising: 80 to 20 mole percent repeat units derived from 2,6-dimethylphenol; and 20 to 80 mole percent repeat units derived from the second monohydric phenol. In some embodiments, the second monohydric phenol comprises 2-methyl-6-phenylphenol.

The hydrophilic block or graft of the amphiphilic block copolymer can comprise a polymerized hydrophilic ethylenically unsaturated monomer. The ethylenically unsaturated monomer can be acrylic acid esters, methacrylic acid esters, hydroxyalkyl acrylates, hydroxyalkyl methacrylates, acrylamide derivatives, vinyl pyridines and alkyl-substituted derivatives thereof, vinyl carbazoles, vinyl acetate, vinyl sulfonic acid, vinyl phosphoric acid, 4-styrenesulfonic acid, N-vinylpyrrolidone, or a combination comprising at least one of the foregoing. Specific ethylenically unsaturated monomers comprise acrylic acid, methacrylic acid, ethyl methacrylate, ethyl acrylate, 2-hydroxyethyl acrylate, 2-hydroxypropyl acrylate, 3-hydroxypropyl acrylate, 1-hydroxyprop-2-yl acrylate, 2-hydroxyprop-1-yl acrylate, 2,3-dihydroxypropyl acrylate, 2-hydroxyethyl methacrylate, maleic anhydride, acrylamide, N-methylacrylamide, N,N-dimethylacrylamide, vinyl acetate, 2-vinyl pyridine, 2-methyl-5-vinyl pyridine, 2-ethyl-5-vinyl pyridine, N-vinyl pyrrolidone, N-vinyl carbazole, vinyl sulfonic acid, vinyl phosphoric acid, phosphoethyl methacrylate, and combinations comprising at least one of the foregoing. In some embodiments, the ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing.

The amphiphilic block copolymer can be made by polymerization of a hydrophilic ethylenically unsaturated monomer in the presence of a hydrophobic polymer comprising poly(phenylene ether) or poly(phenylene ether) copolymer, for example controlled radical polymerization. In some embodiments, polymerization of the hydrophilic ethylenically unsaturated monomer is atom transfer radical polymerization, reversible addition fragmentation transfer polymerization, or stable free radical polymerization. The polymerization of the hydrophilic ethylenically unsaturated monomer can be graft polymerization. The description of the amphiphilic block copolymer herein also applies to the method of forming the amphiphilic block copolymer. For example, in some embodiments, the hydrophilic ethylenically unsaturated monomer comprises methoxy capped poly (ethylene oxide) methacrylate, 4-vinylpyridine, vinyl pyrrolidone, dimethyl acrylamide, 4-acryloylmorpholine, or a combination comprising at least one of the foregoing.

The amphiphilic block copolymer comprises a hydrophobic block, which can be designated (A), and a hydrophilic block, which can be designated (B). The arrangement of blocks (A) and (B) includes a linear structure, a grafted structure, and a radial teleblock structure with or without a branched chain. Linear block copolymers include tapered linear structures and non-tapered linear structures. In some embodiments, the hydrophilic block copolymer has a tapered linear structure. In some embodiments, the hydrophilic block copolymer has a non-tapered linear structure. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks of (A) and (B) in total, wherein the molecular weight of each (A) block can be the same as or different from that of other (A) blocks, and the molecular weight of each (B) block can be the same as or different from that of other (B) blocks. In some embodiments, the amphiphilic block copolymer is a diblock copolymer. The amphiphilic block copolymer can be a comb or brush graft copolymer.

The amphiphilic block copolymer can be used to fabricate porous asymmetric membranes for purification of aqueous streams. In some embodiments, the porous asymmetric membrane comprises a hydrophobic polymer comprising a poly(phenylene ether) or poly(phenylene ether) copolymer; and an amphiphilic block copolymer comprising a hydrophobic block and a hydrophilic block or graft wherein the hydrophobic block comprises a poly(phenylene ether) block, or a poly(phenylene ether) copolymer block.

The hydrophobic polymer can comprise a poly(phenylene ether) having repeat units having the structure (I) wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. In some embodiments, the poly(phenylene ether) comprises poly(2,6-dimethyl-1,4-phenylene ether).

The hydrophobic polymer can comprise a poly(phenylene ether) copolymer comprising: 100 to 20 mole percent repeat units derived from 2,6-dimethylphenol; and 0 to 80 mole percent repeat units repeat units derived from 2,6-dimethylphenol; and 0 to 80 mole percent repeat units derived from the second monohydric phenol (II) wherein Z is $C_{1-12}$ alkyl, $C_{3-12}$ cycloalkyl, or monovalent group (III), wherein in monovalent group (III) q is 0 or 1, and $R^1$ and $R^2$ are independently hydrogen or $C_{1-6}$ alkyl; wherein the mole percents are based on the total moles of all repeat units; and wherein the poly(phenylene ether) copolymer has an intrinsic viscosity of 0.7 to 1.5 deciliters per gram, measured in chloroform at 25° C. In some embodiments, the hydrophobic polymer comprises a poly(phenylene ether) copolymer comprising: 80 to 20 mole percent repeat units derived from 2,6-dimethylphenol; and 20 to 80 mole percent repeat units derived from the second monohydric phenol. In some embodiments, the second monohydric phenol comprises 2-methyl-6-phenylphenol.

The hydrophobic polymer can be a poly(phenylene ether) copolymer having an intrinsic viscosity greater than or equal to 0.7, 0.8, 0.9, 1.0, or 1.1 deciliters per gram, and less than or equal to 1.5, 1.4, or 1.3 deciliters per gram, when measured in chloroform at 25° C. In some embodiments, the intrinsic viscosity is 1.1 to 1.3 deciliters per gram.

In some embodiments, the poly(phenylene ether) copolymer has a weight average molecular weight of 100,000 to 500,000 daltons (Da), as measured by gel permeation chromatography against polystyrene standards. Within this range, the weight average molecular weight can be greater than or equal to 150,000 or 200,000 Da and less than or equal to 400,000, 350,000, or 300,000 Da. In some embodiments, the weight average molecular weight is 100,000 to 400,000 Da, specifically 200,000 to 300,000 Da. The poly(phenylene ether) copolymer can have a polydispersity (ratio of weight average molecular weight to number average molecular weight of 3 to 12. Within this range, the polydispersity can be greater than or equal to 4 or 5 and less than or equal to 10, 9, or 8.

The solubility of the hydrophobic polymer in water-miscible polar aprotic solvents can be 50 to 400 grams per kilogram at 25° C., based on the combined weight of the hydrophobic polymer and the solvent. Within this range, the solubility can be greater than or equal to 100, 120, 140, or 160 grams per kilogram, and less than or equal to 300, 250, 200, or 180 grams per kilogram at 25° C. Advantageously, the use hydrophobic polymers having an intrinsic viscosity of 0.7 to 1.5 deciliters per gram, specifically 1.1 to 1.3 deciliters per gram, and a solubility of 50 to 400 grams per kilogram at 25° C. results in membrane-forming compositions with solution concentrations and viscosities that provide good control over the phase inversion step of membrane formation.

The amphiphilic block copolymer can comprise 20 to 50 weight percent of the hydrophobic block and 80 to 50 weight percent of the hydrophilic block or graft, or 50 to 90 weight percent of the hydrophobic block and 50 to 10 weight percent of the hydrophilic block or graft. The hydrophilic block or graft of the amphiphilic block copolymer can comprise polymerized hydrophilic ethylenically unsaturated monomers. The hydrophilic ethylenically unsaturated monomer can be acrylic acid esters, methacrylic acid esters, hydroxyalkyl acrylates, hydroxyalkyl methacrylates, acrylamide derivatives, vinyl pyridines and alkyl-substituted derivatives thereof, vinyl carbazoles, vinyl acetate, vinyl sulfonic acid, vinyl phosphoric acid, 4-styrenesulfonic acid, N-vinylpyrrolidone, or combinations comprising at least one of the foregoing. Specific hydrophilic ethylenically unsaturated monomers comprise acrylic acid, methacrylic acid, ethyl methacrylate, ethyl acrylate, 2-hydroxyethyl acrylate, 2-hydroxypropyl acrylate, 3-hydroxypropyl acrylate, 1-hydroxy-prop-2-ylacrylate, 2-hydroxyprop-1-yl acrylate, 2,3-dihydroxypropyl acrylate, 2-hydroxyethyl methacrylate, maleic anhydride, acrylamide, N-methylacrylamide, N,N-dimethylacrylamide, vinyl acetate, 2-vinyl pyridine, 4-vinylpyridine, 2-methyl-5-vinyl pyridine, 2-ethyl-5-vinyl pyridine, N-vinylpyrrolidone, N-vinylcarbazole, oxazoline, vinyl sulfonic acid, vinyl phosphoric acid, phosphoethyl methacrylate, and combinations comprising at least one of the foregoing. In some embodiments, the hydrophilic ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing. In some embodiments, the hydrophilic block of the amphiphilic block copolymer comprises poly(acrylic acid).

In some embodiments, the hydrophilic block of the amphiphilic block copolymer used in the porous asymmetric membrane comprises a poly(alkylene oxide) block. The poly(alkylene oxide) block can comprise poly(alkylene oxide) or a poly(alkylene oxide) copolymer wherein the alkylene oxide monomers are ethylene oxide, 1,2-propylene oxide, 1,2-butylene oxide, styrene oxide, or a combination comprising at least one of the foregoing. In some embodiments, the poly(alkylene oxide) comprises poly(ethylene oxide) or a copolymer of ethylene oxide and 1,2-propylene oxide, 1,2-butylene oxide, styrene oxide, or a combination thereof, wherein the poly(alkylene oxide) copolymer contains sufficient ethylene oxide repeat units for the amphiphilic block copolymer to be hydrophilic. In some embodiments, the poly(alkylene oxide) block comprises poly(ethylene oxide) repeat units of the formula

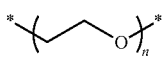

wherein n is 1 to 100. Poly(alkylene oxide) copolymers can be block copolymers or random copolymers, and can be prepared by the polyaddition of ethylene oxide, 1,2-propylene oxide, 1,2-butylene oxide, styrene oxide, or a combination comprising at least one of the foregoing, onto a monohydroxyl or di-hydroxyl initiator compound. The poly(alkylene oxide) can have a number average molecular weight of 200 to 5,000 grams per mole, specifically 500 to 2,500 grams per mole.

In some embodiments, the hydrophilic block of the amphiphilic block copolymer used in the porous asymmetric membrane comprises poly(ethylene oxide). The hydrophobic block can have a number average molecular weight of 10,000 to 100,000 Daltons (Da), specifically about 30,000 Da, and the poly(ethylene oxide) block can have a number average molecular weight of 500 to 10,000 Da, specifically about 1,000 Da.

In some embodiments, hydrophilic polymer is excluded from the porous asymmetric membrane. The excluded hydrophilic polymer can comprise, for example, polyacrylamide, poly(N,N-dimethylacrylamide), poly(vinyl alcohol), a poly(vinyl ether), a poly(vinyl ester), such as poly(vinyl acetate) or poly(vinyl propionate), a poly(vinyl aldehyde), such as poly(vinyl formal) or poly(vinyl butryal), a poly(vinyl amine), such as poly(4-vinylpyridine), poly(N-vinylpyrrolidone), poly(N-vinylimidazole), poly(4-acryloylmorpholine), a poly(oxazoline), poly(ethyleneamine), poly(ethylene oxide), poly(propylene oxide), a poly(ethylene oxide) monoether, a block copolymer of poly(ethylene oxide) and poly(propylene oxide), poly(alkoxy-capped poly(ethylene oxide) methacrylate), or a combination comprising at least one of the foregoing. In some embodiments, the excluded hydrophilic polymer comprises poly(N-vinylpyrrolidone), a poly(oxazoline), poly(ethylene oxide), poly(propylene oxide), a poly(ethylene oxide) monoether or monoester, a poly(propylene oxide) monoether or monoester, a block copolymer of poly(ethylene oxide) and poly(propylene oxide), polysorbate, cellulose acetate, or a combination comprising at least one of the foregoing. In some embodiments, the excluded hydrophilic copolymer comprises poly(N-vinylpyrrolidone). Hydrophilic polymers have been used in membrane-forming compositions to impart a viscosity to the membrane-forming composition that is conducive to the formation of a porous asymmetric membrane useful for purification of aqueous streams. However, hydrophilic polymers, when present in the porous asymmetric membrane, are prone to extraction in the phase inversion and washing steps of membrane fabrication. Moreover the hydrophilic polymer can be leached out of the membrane in the end-use application—membrane treatment of aqueous streams. For example, polyethersulfone can be blended with poly(N-vinylpyrrolidone), and the two polymers can be co-precipitated from solution to form a membrane. Excess poly(N-vinylpyrrolidone) must be washed off of the membrane with water, which results in a waste of valuable material, and which produces an aqueous waste comprising the excess poly(N-vinylpyrrolidone). Advantageously, the porous asymmetric membranes described herein are useful for purification of aqueous streams in the absence of hydrophilic copolymers or any other viscosity modifier.

Porous asymmetric membranes can be fabricated from poly(2,6-dimethyl-1,4-phenylene ether), polyethersulfone (PESU), polysulfone (PSU), or polyphenylsulfone (PPSU). Advantageously, these polymers are compatible with the hydrophobic polymers described herein. Thus, in addition to hydrophobic polymers described herein, the porous asymmetric membrane can further comprise poly(2,6-dimethyl-1,4-phenylene ether), polyethersulfone, polysulfone, polyphenylsulfone, or a combination comprising at least one of the foregoing. In this way, a combination of beneficial properties attributable to each hydrophobic polymer in a blend can be obtained.

The porous asymmetric membrane described herein has many advantageous properties. The amphiphilic block copolymers described herein provide porous asymmetric membranes having hydrophilic surfaces, as measured, for example, by contact angle. Because of the hydrophilic surface, the porous asymmetric membranes can be used for purification of aqueous streams, and are resistant to fouling. Advantageously, the presence of the amphiphilic block copolymer in the porous asymmetric membrane does not adversely affect the pore size distribution, membrane selectivity, or permeation flux. The poly(phenylene ether) and poly(phenylene ether) copolymers described herein are miscible with the poly(phenylene ether) or poly(phenylene ether) copolymer blocks of the amphiphilic block copolymer. Therefore, the hydrophobic blocks of the amphiphilic block copolymer tend to dissolve in the poly(phenylene ether) or poly(phenylene ether) copolymer of the porous asymmetric membrane, as indicated by reduced glass transition temperatures for the hydrophobic polymer phase. In this way, the amphiphilic block copolymers resist extraction by water. Advantageously, this results in reduced loss of amphiphilic block copolymer in the membrane phase inversion and washing steps, and reduced loss of amphiphilic block copolymer upon contact with aqueous streams in end-use applications.

The porous asymmetric membrane described herein can be fabricated from a porous asymmetric membrane-forming composition. The porous asymmetric membrane-forming composition comprises a hydrophobic polymer comprising a poly(phenylene ether) or poly(phenylene ether) copolymer; an amphiphilic block copolymer comprising a hydrophobic block and a hydrophilic block or graft, wherein the hydrophobic block comprises a poly(phenylene ether) block or a poly(phenylene ether) copolymer block; and a water-miscible polar aprotic solvent; wherein the hydrophobic polymer and amphiphilic block copolymer are dissolved in the water-miscible polar aprotic solvent. The description of the porous asymmetric membrane herein is also applicable to the membrane-forming composition. For example in the membrane-forming composition, the first monohydric phenol of the poly(phenylene ether) copolymer can comprise 2-methyl-6-phenylphenol.

The porous asymmetric membranes described herein can be prepared from the porous asymmetric membrane-forming composition. Thus, a method of forming the porous asymmetric membrane comprises: dissolving a hydrophobic polymer and an amphiphilic block copolymer in a water-miscible polar aprotic solvent to form a porous asymmetric membrane-forming composition; wherein the hydrophobic polymer comprises a poly(phenylene ether) or poly(phenylene ether) copolymer; and the amphiphilic block copolymer comprises a hydrophobic block and a hydrophilic block or graft, wherein the hydrophobic block comprises a poly(phenylene ether) block, or a poly(phenylene ether) copolymer block; phase-inverting the membrane-forming composition in a first non-solvent to form the porous asymmetric membrane; optionally washing the porous asymmetric membrane in a second non-solvent; and drying the porous asymmetric membrane.

The water-miscible polar aprotic solvent can be, for example, N,N-dimethylformamide (DMF), N,N-dimethylacetamide (DMAC), N-methyl-2-pyrrolidone (NMP), N-ethyl-2-pyrrolidone, dimethyl sulfoxide (DMSO), dimethyl sulfone, sulfolane, butyrolactone; and combinations comprising at least one of the foregoing. In some embodiments, the water-miscible polar aprotic solvent comprises N-methyl-2-pyrrolidone. A solvent mixture comprising the water-miscible polar aprotic solvent can be used. The solvent mixture can comprise water. For example, the solvent mixture can comprise N-methyl-2-pyrrolidone and water. The solubility of the poly(phenylene ether) copolymer in the water-miscible polar aprotic solvent can be 50 to 400 grams per kilogram at 25° C., based on the combined weight of the poly(phenylene ether) copolymer and the solvent. Within this range, the solubility can be greater than or equal to 100, 120, 140, or 160 grams per kilogram, and less than or equal to 300, 250, 200, or 180 grams per kilogram at 25° C. Advantageously, a hydrophobic polymer solubility of 50 to 400 grams per kilogram provides membrane-forming compositions conducive to the formation of porous asymmetric membranes.

The first non-solvent composition comprises water, a water-miscible polar aprotic solvent, or a combination comprising at least one of the foregoing. The water-miscible polar aprotic solvent can be any of the water-miscible polar aprotic solvents used for the membrane-forming composition. In some embodiments, the first non-solvent composition comprises 10 to 100 weight percent water and 0 to 90 weight percent N-methyl-2-pyrrolidone, based on the total weight of the first non-solvent composition. Within this range, the first non-solvent composition can comprise 10 to 90 weight percent, specifically 10 to 80 weight percent, water and 10 to 90 weight percent, specifically 20 to 90 weight percent, N-methyl-2-pyrrolidone. In some embodiments, the first non-solvent composition comprises about 70 weight percent water and about 30 weight percent N-methyl-2-pyrrolidone. The first non-solvent composition serves as a coagulation, or phase inversion, bath for the membrane-forming composition. The membrane is formed by contacting the membrane-forming composition with the first non-solvent composition. The copolymer, which is near its gel point in the membrane-forming composition, coagulates, or precipitates as a film or hollow fiber.

The first non-solvent serves as a coagulation, or phase inversion, bath for the porous asymmetric membrane-forming composition. The membrane is formed by contacting the membrane-forming composition with the first non-solvent. The hydrophobic polymer, which may be near its gel point in the membrane-forming composition, coagulates, or precipitates as a film or hollow fiber. The second non-solvent serves to optionally rinse residual water-miscible solvent, and hydrophilic polymer, if present, from the membrane. The first and second non-solvents can be the same or different, and can comprise water, or a mixture of water and a water-miscible polar aprotic solvent. In some embodiments the first and second non-solvents are independently water or a water/N-methyl-2-pyrrolidone mixture. In some embodiments, the first and second non-solvents are both water. The water can be deionized.

Any of several techniques for the phase inversion step of membrane formation can be used. For example, the phase inversion step can be a thy-phase separation method in which the dissolved hydrophobic polymer is precipitated by evaporation of a sufficient amount of solvent mixture to form the membrane. The phase inversion step can also be a wet-phase separation method in which the dissolved hydrophobic polymer is precipitated by immersion in the first non-solvent to form the membrane. The phase inversion step can be a dry-wet phase separation method, which is a combination of the thy-phase and the wet-phase methods. The phase inversion step can be a thermally-induced separation method in which the dissolved hydrophobic polymer is precipitated or coagulated by controlled cooling to form the membrane. The membrane, once formed, can be subjected to membrane conditioning or pretreatment, prior to its end-use. The conditioning or pretreatment can be thermal annealing to relieve stresses or pre-equilibration in the expected aqueous feed. The description of the porous asymmetric membrane herein is also applicable to the method of forming the porous asymmetric membrane. For example in the method of forming the porous asymmetric membrane, the first monohydric phenol of the poly(phenylene ether) copolymer can comprise 2-methyl-6-phenylphenol.

The molecular weight cut off (MWCO) of a membrane is the lowest molecular weight solute in which 90 weight percent (wt %) or greater of the solute is retained by the membrane. The porous asymmetric membranes made by the method can have a MWCO of 500 to 40,000 daltons (Da), specifically 1,000 to 20,000 Da, more specifically 2,000 to 8,000 Da, or still more specifically 3,000 to 7,000 Da. Furthermore, any of the foregoing MWCO ranges can be present in combination with a desirable permeate flux, such as clean water permeate flux (CWF). Flux across the membrane is driven by the osmotic or absolute pressure differential across the membrane, referred to herein as the trans-membrane pressure (TMP). The trans-membrane pressure can be 1 to 500 kilopascals (kPa), specifically 2 to 400 kPa, and more specifically 4 to 300 kPa.

The porous asymmetric membrane can be in a porous asymmetric hollow fiber configuration. The diameter of the fiber can be 50 to 5000 a micrometers (μm), specifically 100 to 2000 μm. A porous asymmetric hollow fiber module can comprise bundles of porous asymmetric hollow fibers. In some embodiments, the fiber bundle comprises 10 to 10,000 porous asymmetric hollow fibers. The asymmetric hollow fibers can be bundled longitudinally, potted in a curable resin on both ends, and encased in a pressure vessel to form the asymmetric hollow fiber module.

Depending upon the pore size, the porous asymmetric membranes described herein can be used for media filtration, microfiltration, ultrafiltration, nanofiltration, or reverse osmosis. For media filtration, the pore size can be about 100 to about 1,000 micrometers. For microfiltration, the pore size can be about 0.03 to about 10 micrometers. For ultrafiltration, the pore size can be about 0.002 to 0.1 micrometers. For nanofiltration, the pore size can be about 0.001 to about 0.002 micrometers. In some embodiments, the porous asymmetric membrane has a surface pore size of 0.001 to 0.05 micrometers (μm), specifically 0.005 to 0.01 μm. For reverse osmosis, the pore size can be about 0.0001 to 0.001 micrometers. The module can also be a membrane contactor module, a pervaporation module, a dialysis module, an osmosis module, an electrodialysis module, a membrane electrolysis module, an electrophoresis module, and a membrane distillation module.

The porous asymmetric membranes disclosed herein are useful for treatment of aqueous streams. Depending upon pore size and porous asymmetric membrane configuration, the membranes can be used to remove suspended matter, particulate matter, sands, silt, clays, cysts, algae, microorganisms, bacteria, viruses, colloidal matter, synthetic and naturally occurring macromolecules, dissolved organic compounds, salts, or a combination comprising at least one of the foregoing. Thus, the porous asymmetric membranes disclosed herein can be used in wastewater treatment, water purification, food processing, the dairy industry, biotechnology, pharmaceuticals, and healthcare.

Embodiment 1

An amphiphilic block copolymer, comprising, consisting essentially of, or consisting of a hydrophobic block comprising, consisting essentially of, or consisting of a poly(phenylene ether) block or a poly(phenylene ether) copolymer block; and a hydrophilic block or graft.

Embodiment 2

The amphiphilic block copolymer of embodiment 1, comprising 20 to 50 weight percent of the hydrophobic block and 50 to 80 weight percent of the hydrophilic block or graft.

Embodiment 3

The amphiphilic block copolymer of embodiment 1 or 2, wherein the hydrophobic block comprises a poly(phenylene ether) having repeat units (I) wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{112}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

Embodiment 4

The amphiphilic block copolymer of any one of embodiments 1-3, wherein the hydrophobic block comprises a poly(phenylene ether) copolymer comprising: 100 to 20 mole percent repeat units derived from 2,6-dimethylphenol; and 0 to 80 mole percent repeat units derived from a second monohydric phenol (II) wherein Z is $C_{112}$ alkyl or cycloalkyl, or a monovalent group (III) wherein q is 0 or 1, and $R^1$ and $R^2$ are independently hydrogen or $C_{16}$ alkyl; wherein all mole percents are based on the total moles of all repeat units; and wherein the poly(phenylene ether) copolymer block has an intrinsic viscosity of 0.1 to 0.5 deciliters per gram, measured in chloroform at 25° C.

Embodiment 5

The amphiphilic block copolymer of any of embodiments 1-4, wherein the hydrophobic block of the amphiphilic copolymer comprises a poly(phenylene ether) copolymer comprising: 80 to 20 mole percent repeat units derived from 2,6-dimethylphenol; and 20 to 80 mole percent repeat units derived from the second monohydric phenol.

Embodiment 6

The amphiphilic block copolymer of embodiment 5, wherein the second monohydric phenol comprises 2-methyl-6-phenylphenol.

Embodiment 7

The amphiphilic block copolymer of embodiments 1-6, wherein the hydrophilic block or graft comprises a polymerized hydrophilic ethylenically unsaturated monomer.

Embodiment 8

The amphiphilic block copolymer of embodiment 7, wherein the hydrophilic ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing.

Embodiment 9

A method of making an amphiphilic block copolymer comprising polymerization of a hydrophilic ethylenically unsaturated monomer in the presence of a hydrophobic polymer comprising, consisting essentially of, or consisting of poly(phenylene ether) or a poly(phenylene ether) copolymer to make the amphiphilic block copolymer.

Embodiment 10

The method of embodiment 9, wherein the polymerization is controlled radical polymerization.

Embodiment 11

The method of embodiment 10, wherein the controlled radical polymerization is atom transfer radical polymerization, reversible addition fragmentation transfer polymerization, or stable free radical polymerization.

Embodiment 12

The method of embodiment 9, wherein the polymerization is graft polymerization.

Embodiment 13

The method of any of embodiments 9-12, wherein the hydrophilic ethylenically unsaturated monomer comprises methoxy-capped poly(ethylene oxide) methacrylate, 4-vinylpyridine, vinyl pyrrolidone, N,N-dimethylacrylamide, 4-acryloylmorpholine, or a combination comprising at least one of the foregoing.

Embodiment 14

A porous asymmetric membrane comprising, consisting essentially of, or consisting of: a hydrophobic polymer comprising, consisting essentially of, or consisting of a poly(phenylene ether) or poly(phenylene ether) copolymer; and an amphiphilic block copolymer comprising a hydrophobic block comprising a poly(phenylene ether) block or a poly(phenylene ether) copolymer block; and a hydrophilic block or graft.

Embodiment 15

A porous asymmetric membrane-forming composition comprising, consisting essentially of, or consisting of: a hydrophobic polymer comprising, consisting essentially of, or consisting of a poly(phenylene ether) or poly(phenylene ether) copolymer; an amphiphilic block copolymer comprising a hydrophobic block comprising a poly(phenylene ether) block or a poly(phenylene ether) copolymer block, and a hydrophilic block or graft; and a water-miscible polar aprotic solvent, wherein the hydrophobic polymer and amphiphilic block copolymer are dissolved in the water-miscible polar aprotic solvent.

Embodiment 16

A method of forming a porous asymmetric membrane, the method comprising: dissolving: a hydrophobic polymer comprising, consisting essentially of, or consisting of a poly(phenylene ether) or poly(phenylene ether) copolymer and an amphiphilic block copolymer comprising a hydrophobic block comprising a poly(phenylene ether) or poly (phenylene ether) copolymer, and a hydrophilic block or graft, in a water-miscible polar aprotic solvent to form a porous asymmetric membrane-forming composition; phase-inverting the porous asymmetric membrane forming-composition in a first non-solvent to form the porous asymmetric membrane; optionally washing the porous asymmetric membrane in a second non-solvent; and optionally drying the porous asymmetric membrane to form the porous asymmetric membrane.

Embodiment 17

The porous asymmetric membrane, composition, or method of any of embodiments 14-16, wherein the hydrophobic polymer comprises a poly(phenylene ether) having repeat units (I), wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. Embodiment 18. The porous asymmetric membrane, composition, or method of any embodiments 14-17, wherein the hydrophobic polymer comprises a poly(phenylene ether) copolymer comprising: 100 to 20 mole percent repeat units derived from 2,6-dimethylphenol; and 0 to 80 mole percent repeat units derived from a second monohydric phenol (II) wherein Z is $C_{112}$ alkyl or cycloalkyl, or a monovalent group (III), wherein q is 0 or 1, and $R^1$ and $R^2$ are independently hydrogen or $C_{1-6}$ alkyl; wherein the mole percents are based on the total moles of all repeat units; and wherein the poly(phenylene ether) copolymer has an intrinsic viscosity of 0.7 to 1.5 deciliters per gram, measured in chloroform at 25° C.

Embodiment 19

The porous asymmetric membrane, composition, or method of any of embodiments 14-18, wherein the hydrophobic polymer comprises a poly(phenylene ether) copolymer comprising: 80 to 20 mole percent repeat units derived from 2,6-dimethylphenol; and 20 to 80 mole percent repeat units derived from the second monohydric phenol.

Embodiment 20

The porous asymmetric membrane, composition, or method of embodiment 19, wherein the second monohydric phenol comprises 2-methyl-6-phenylphenol.

Embodiment 21

The porous asymmetric membrane, composition, or method of any of embodiments 14-20, wherein the hydrophobic polymer has an intrinsic viscosity of 0.7 to 1.5 deciliters per gram, measured in chloroform at 25° C.

Embodiment 22

The porous asymmetric membrane, composition, or method of any one of embodiments 14-21, wherein the solubility of the hydrophobic polymer in the water-miscible polar aprotic solvent is 50 to 400 grams per kilogram at 25° C., based on the combined weight of the poly(phenylene ether) copolymer and the solvent.

Embodiment 23

The porous asymmetric membrane, composition, or method of any of embodiments 14-22, wherein the amphiphilic block copolymer comprises 20 to 50 weight percent of the hydrophobic block and 50 to 80 weight percent of the hydrophilic block or graft.

Embodiment 24

The porous asymmetric membrane, composition, or method of any of embodiments 14-23, wherein the hydrophobic block of the amphiphilic block copolymer comprises a poly(phenylene ether) copolymer.

Embodiment 25

The porous asymmetric membrane, composition, or method of any of embodiments 14-24, wherein the hydrophobic block of the amphiphilic block copolymer comprises a poly(phenylene ether) block having repeat units (I) wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{112}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

Embodiment 26

The porous asymmetric membrane, composition, or method of any of embodiments 14-25, wherein the hydrophobic block of the amphiphilic block copolymer comprises a poly(phenylene ether) copolymer block comprising: 100 to 20 mole percent repeat units derived from 2,6-dimethylphenol; and 0 to 80 mole percent repeat units derived from a second monohydric phenol (II) wherein Z is $C_{1-12}$ alkyl or cycloalkyl, or a monovalent group (III), wherein q is 0 or 1, and $R^1$ and $R^2$ are independently hydrogen or $C_{1-6}$ alkyl; wherein all mole percents are based on the total moles of all repeat units; and wherein the poly(phenylene ether) copolymer block is derived from a poly(phenylene ether) copolymer having an intrinsic viscosity of 0.1 to 0.5 deciliters per gram, measured in chloroform at 25° C.

Embodiment 27

The porous asymmetric membrane of embodiment 24, wherein the hydrophobic block of the amphiphilic block copolymer comprises a poly(phenylene ether) copolymer block comprising: 80 to 20 mole percent repeat units derived from 2,6-dimethylphenol; and 20 to 80 mole percent repeat units derived from the second monohydric phenol.

Embodiment 28

The porous asymmetric membrane, composition, or method of any of embodiments 18-20 or 27-28, wherein the second monohydric phenol is 2-methyl-6-phenylphenol.

Embodiment 29

The porous asymmetric membrane, composition, or method of any of embodiments 14-28, wherein the hydrophilic block or graft of the amphiphilic block copolymer comprises polymerized hydrophilic ethylenically unsaturated monomers.

Embodiment 30

The porous asymmetric membrane, composition, or method of any of embodiments 14-29, wherein the hydrophilic ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing.

Embodiment 31

The porous asymmetric membrane, composition, or method of any of embodiments 14-30, wherein the hydrophilic block comprises poly(ethylene oxide) or a copolymer of ethylene oxide with 1,2-propylene oxide, 1,2-butylene oxide, styrene oxide, or a combination comprising at least one of the foregoing.

Embodiment 32

The porous asymmetric membrane, composition, or method of any of embodiments 14-31, wherein the hydrophilic block of the amphiphilic block copolymer comprises poly(ethylene oxide).

Embodiment 33

The porous asymmetric membrane, composition, or method of any of embodiments 14-32, wherein hydrophilic polymers are excluded.

Embodiment 34

The porous asymmetric membrane, composition, or method of embodiment 33, wherein the hydrophilic polymer is poly(N-vinylpyrrolidone), a poly(oxazoline), poly(ethylene oxide), poly(propylene oxide), a poly(ethylene oxide) monoether or monoester, a poly(propylene oxide) monoether or monoester, a block copolymer of poly(ethylene oxide) and poly(propylene oxide), polysorbate, cellulose acetate, or a combination comprising at least one of the foregoing.

Embodiment 35

The porous asymmetric membrane, composition, or method of any of embodiments 14-34, further comprising poly(2,6-dimethyl-1,4-phenylene ether), polyethersulfone, polysulfone, polyphenylsulfone, or a combination comprising at least one of the foregoing.

Embodiment 36

The porous asymmetric membrane of any of embodiments 17-35, wherein a configuration of the porous asymmetric membrane is a sheet, disc, spiral wound, plate and frame, hollow fiber, capillary, and tubular.

Embodiment 37

The porous asymmetric membrane of any of embodiments 17-35, wherein the membrane is a porous asymmetric flat sheet.

Embodiment 38

The porous asymmetric membrane of any of embodiments 17-35, wherein the asymmetric membrane is in a form of a spiral.

Embodiment 39

The porous asymmetric membrane of any of embodiments 17-35, wherein the membrane is a porous asymmetric hollow fiber.

Embodiment 40

A separation module comprising the porous asymmetric membrane of any of embodiments 17-39.

Embodiment 41

The separation module of embodiment 40, wherein the separation module is designed for dead-end filtration, outside-in filtration, inside-out filtration, or cross-flow filtration.

Embodiment 42

The separation module of embodiment 40, wherein the separation module is a microfiltration module, a nanofiltration module, an ultrafiltration module, a reverse osmosis module, a water pretreatment module, or a membrane distillation module.

Embodiment 43

The separation module of embodiment 40, comprising a bundle of asymmetric hollow fibers.

Embodiment 44

The separation module of embodiment 43, wherein the bundle of asymmetric hollow fibers are disposed within an enclosure configured for fluid separation.

Embodiment 45

The separation module of any of embodiments 40-44, wherein the separation module comprises an enclosure configured to contain the bundle, the enclosure having an outlet configured for withdrawing a permeate fluid; a first encasement comprising a thermoset or a thermoplastic polymeric material and located at a first end of the bundle, arranged such that the hollow fiber membranes are embedded in the first encasement and communicate through the first encasement and are open on an outer face of the first encasement; a second encasement comprising a thermoset or a thermoplastic polymeric material and located at a second end of the bundle opposite the first end of the bundle, arranged such that the hollow fiber membranes are embedded in the second encasement and communicate through the second encasement and are open on an outer face of the second encasement; a first end cap arranged and configured for attaching and sealing to the first end of the bundle or enclosures at or near the first encasement; a second end cap arranged and configured for attaching and sealing to the second end of the bundle or enclosures at or near the second encasement; an inlet for introducing a fluid mixture to be separated into bores of the hollow fiber membranes at the first encasement; and an outlet for withdrawing a retentate fluid from the bores for the hollow fiber membranes at the second encasement.

Embodiment 46

The separation module of any of embodiments 40-45, comprising a plurality of bundles.

Embodiment 47

The separation module of any of embodiments 40-42, wherein separation module comprises: a hollow core comprising perforations; the asymmetric membrane wound around the core; and a spacer disposed adjacent the asymmetric membrane.

Embodiment 48

The separation module of any of embodiments 40-42 and 47, further comprising at least one of an inner spacer or an outer spacer adjacent the asymmetric membrane.

Embodiment 49

A spiral wound module comprising the porous asymmetric flat sheet of embodiment 37.

Embodiment 50

A hollow fiber module comprising 10 to 10,000 of the porous asymmetric hollow fibers of embodiment 39.

Embodiment 51

A method of filtration comprising passing a feedstream through the separation module of any of embodiments 40-50 such that it contacts a first side of the porous asymmetric membrane, and passing a permeate through the porous asymmetric membrane to provide a permeate stream and a concentrated feedstream.

Embodiment 52

A dialysis device for conducting hemodialysis on a patient suffering from liver failure, the device comprising the porous asymmetric membrane of any of embodiments 17-35 or 36-39.

Embodiment 53

The dialysis device of embodiment 52, wherein the dialysis device comprises the separation module of any of embodiments 40-48.

Embodiment 54

The dialysis device of embodiment 53, wherein the asymmetric membrane allows the passage of molecules having a molecular weight of up to 45 kilodaltons with a sieving coefficient of 0.1 to 1.0 in the presence of whole blood, wherein the dialysis device reduces the concentration of protein-bound toxins and inflammatory cytokines in the blood of the patient, wherein the dialysis device reduces the concentration of unconjugated bilirubin and bile acids in the blood of the patient, wherein the dialysate passing the said dialysis membrane comprises from 1% to 25% human serum albumin. A method of dialysis, the method comprising passing blood through the separation module of claim 52 such that it contacts a first side of the porous asymmetric membrane, and passing a dialysis solution through the separation module such that it contacts a second opposite side of the porous asymmetric membrane to remove waste products from the blood.

Embodiment 56

A method for the treatment of liver failure, the method comprising conducting hemodialysis on a patient suffering from liver failure using a liver dialysis device comprising the porous asymmetric membrane of any of embodiments 17-35 or 36-39.

Embodiment 57

The method for the treatment of liver failure of embodiment 56, wherein the dialysis device comprises the separation module of any of embodiments 40-50.

Embodiment 58

A method of sugar purification, the method comprising passing a fluid comprising a combination of polysaccharides through the separation module of any of embodiments 40-50 such that the fluid contacts a first side of the porous asymmetric membrane, and passing a polysaccharide through the membrane to purify the sugar.

Embodiment 59

A method of protein or enzyme recovery comprising: urging a fluid comprising a protein or enzyme through the separation module of any of claims 40-48 such that the fluid contacts a first side of the porous asymmetric membrane; and removing a component from the fluid by passing the component through the membrane to provide a retentate stream enriched in the protein or enzyme to recover the protein or enzyme.

Embodiment 60

A method of water purification comprising: passing a feedwater through the separation module of any of embodiments 40-50 such that the feedwater contacts a first side of the porous asymmetric membrane with a pressure greater than osmotic pressure to produce purified water.

Embodiment 61

A water pretreatment system comprising: a concentration module comprising the porous asymmetric membrane of any of embodiments 17-39 for concentrating a feed and diluting a recirculating hypertonic solution to produce a slipstream; and a water makeup element for receiving the slipstream and combining the slipstream with the hypertonic solution to provide solutes to the recirculating hypertonic solution, wherein the recirculating hypertonic solution is suitable for desalination.

Embodiment 62

The water pretreatment system of embodiment 61, wherein the concentrator comprises the separation module of any of embodiments 40-48.

Embodiment 63

A method of pretreating water, the method comprising: receiving a feedwater; separating the feed water into a concentrator feed and a slipstream; processing the concentrator feed in a concentrator comprising the porous asymmetric membrane of embodiments 17-39 to generate a hypertonic solution; and combining the slipstream and the hypertonic solution to generate an effluent capable of decomposition into purified water and a recirculating hypertonic solution.

Embodiment 64

The method of embodiment 63, wherein the concentrator comprises the separation module of any of embodiments 40-50.

Embodiment 65

A blood oxygenator comprising: a housing, a plurality of hollow fibers comprising the porous asymmetric membrane of any of embodiments 17-39 disposed within the housing for transporting a first fluid therethrough, a first inlet in fluid communication with the fibers for delivering the first fluid thereto, a first outlet in fluid communication with the fibers for receiving the first fluid therefrom, a second inlet and a second outlet in communication with regions disposed exteriorly of the hollow fibers.

Embodiment 66

The blood oxygenator of embodiment 65, wherein the porous asymmetric membrane is contained within the separation module of any of embodiments 40-48.

Embodiment 67

The blood oxygenator of embodiment 66, wherein the first fluid is blood, and wherein the second fluid is an oxygen containing gas.

Embodiment 68

The blood oxygenator of embodiment 66, wherein the first fluid is blood, and wherein the second fluid is a liquid which comprises molecular oxygen.

Embodiment 69

A separation module for oil-containing wastewater treatment, which separates water-insoluble oil from oil-containing wastewater, the separation module comprising the porous asymmetric membrane of any of embodiments 17-39.

Embodiment 70

A system for wastewater treatment comprising the separation module of embodiment 69.

Embodiment 71

A method of wastewater treatment comprising: treating an oil-containing wastewater with the system of embodiment 70.

Embodiment 72

The method of embodiment 71 further comprising directing a cleaning liquid comprising an alkaline aqueous solution to a surface of the porous asymmetric membrane to remove water-insoluble oil adhering to the surface of the porous asymmetric membrane of the separation membrane module.

Embodiment 73

An ultrafiltration device, the device including: a filter housing for a separation module, the filter housing comprising an inlet and an outlet, and the porous asymmetric membrane of embodiment 36 configured as a bundle of tubular or capillary membranes fitted in the filter housing, the tubular or capillary membranes being permanently hydrophilic, whereby the tubular or capillary membranes are open at a first inlet end and sealed at the other end and are, at the first end, held in a membrane holder which closes off the space in between the capillary membranes and the filter housing wherein the pore size of the tubular or capillary ultrafiltration membranes decreases in the direction of the liquid flow.

Embodiment 74

An apparatus for purification of a liquid by membrane distillation comprising: a feed channel; a distillate channel; and a retentate channel, wherein the distillate channel and the retentate are separated by the porous asymmetric membrane of any of embodiments 17-39.

Embodiment 75

The apparatus for purification of a liquid by membrane distillation of embodiment 74, whereby the apparatus comprises a segment comprising a first distribution chamber for a feed liquid to be supplied, a second distribution chamber located opposite the first distribution chamber for feed liquid to be discharged, a third distribution chamber for retentate stream to be supplied and a fourth distribution chamber opposite the third the third distribution chamber for the retentate stream to be discharged, whereby the segment is provided with a first pump for pumping the feed stream pressure into the segment and a second pump which is arranged downstream the second distribution chamber for pumping the retentate stream under pressure into the retentate channel, the wall between the feed channel and the distillate channel comprises a condenser surface in the form of a non-porous membrane, and the wall between the retentate channel and the distillate channel comprises the porous asymmetric membrane, and wherein inside the retentate channel a further channel is arranged for allowing a fluid stream to be brought into heat transfer contact with the retentate stream.

The invention is further illustrated by the following non-limiting examples.

PREPARATIVE EXAMPLES: SYNTHESIS OF MPP-DMP COPOLYMERS

The preparation, characterization and properties of poly(phenylene ether)s has been described by G Cooper and J Bennett in *Polymerization Kinetics and Technology*, Volume 128, pages 230-257, Jun. 1, 1973 (ACS Advances in Chemistry Series). MPP-DMP copolymers were prepared by dissolving the monomers in toluene and conducting oxidative copolymerization mediated by copper-diamine catalyst complexes in the presence of oxygen. The copolymerizations were conducted in a bubbling polymerization reactor equipped with a stirrer, temperature control system, nitrogen padding, oxygen bubbling tube, and computerized control system. The reactor was also equipped with a feeding pot and pump for dosing reactants into the reactor. When the desired degree of polymerization was achieved, the flow of oxygen was stopped and the copper complex was removed from the toluene solution by liquid-liquid extraction with a water-soluble chelating agent. The DMP-MPP copolymers were recovered via non-solvent precipitation by pouring the toluene solution into an excess of methanol with vigorous stirring followed by drying in an oven at 120° C. under a stream of dry nitrogen.

Polymers may be characterized for their glass transition temperature (Tg) using differential scanning calorimetry (DSC). The molecular weight distributions of the polymers may be characterized via size-exclusion chromatography methods employing chloroform as the mobile phase and calibration against a polystyrene standard. Alternatively the degree of polymerization can be characterized by measurement of the intrinsic viscosity (IV) in chloroform using the Ubbelohde method.

TABLE 1

| Materials | |
|---|---|
| Abbreviation | Chemical Name |
| DMP | 2,6-Dimethylphenol |
| MPP | 2-Methyl-6-phenylphenol |
| DBA | Di-n-butylamine |
| DBEDA | N,N'-Di-tert-butylethylenediamine |
| DMBA | N,N-Dimethylbutylamine |
| QUAT | Didecyldimethyl ammonium chloride |
| NTA | Nitrilotriacetic acid |
| CAT | Solution of $Cu_2O$ in concentrated HBr, 6.5 wt. % Cu |
| NMP | N-Methyl-2-pyrrolidone, available from ThermoFisher. |
| 6020P | A polyethersulfone (PES), available from BASF as ULTRASON ™ E 6020 P. |
| PES | A polyethersulfone, available from BASF as ULTRASON ™ E 6020 P. |
| PVP K30 | Poly(vinyl pyrrolidone) having a K value of 26-35, calculated for a 1% aq. solution by the Finkentscher equation; and available from Aldrich. |
| PVP K90 | Poly(vinyl pyrrolidone) having a K value of 90-100, calculated for a 1% aq. solution by the Finkentscher equation; and available from Aldrich. |

Preparative Example 1: Preparation of MPP-DMP Copolymer with 50 Mole Percent MPP in 1.8-Liter Reactor Toluene (622.88 grams), DBA (8.1097 grams), DMBA (30.71 grams), and 5.44 grams of a diamine mix consisting of 30 weight percent (wt. %) DBEDA, 7.5 weight percent QUAT, and the balance toluene, were charged to a bubbling polymerization reactor and stirred under a nitrogen atmosphere at 25° C. A mix of 6.27 grams HBr and 0.5215 grams $Cu_2O$ was added. Oxygen flow to the vessel was begun after 4 minutes of monomer mixture addition. The reactor temperature was ramped to 40° C. in 18 min, maintained at 40° C. for 57 min, ramped to 45 C in 11 min, maintained at 45° C. for 33 min and ramped to 60° C. in 10 min. 403.67 grams of monomer solution (20.3 wt. % DMP, 30.6 wt. % MPP and 49.1 wt. % toluene) was added over 35 minutes. Oxygen flow was maintained for 115 minutes, at which point the oxygen flow was stopped and the reaction mixture was immediately transferred to a vessel containing 11.07 grams NTA salt and 17.65 grams DI (deionized) water. The resulting mixture was stirred at 60° C. for 2 hours, and the layers were then allowed to separate. The decanted light phase was precipitated in methanol, filtered, reslurried in methanol, and filtered again. The copolymer was obtained as a dry powder after drying in a vacuum oven under nitrogen blanket at 110° C.

Preparative Examples 2-4: Preparation of MPP-DMP Copolymers with 20, 50, and 80 Mole % MPP with IV's of ~1 Deciliter Per Gram The process of Preparative Example 1 was scaled to a one gallon steel bubbling reactor and copolymerization was conducted in similar fashion as described above. The ingredients for the batch reactor charges and continuous monomer feed solution are shown in Table 2. After charging the reactor the contents were brought with stirring to 25° C. before starting the continuous feed of monomer in toluene and then oxygen feed. The monomer/toluene mixture was fed over 45 minutes, and oxygen feed was maintained until 130 minutes. The reactor temperature was ramped to 45° C. at 90 minutes and then ramped to 60° C. at 130 minutes. The reaction contents were then transferred to a separate vessel for addition of NTA to chelate the copper, followed by separation of the toluene solution from the aqueous phase in centrifuge, precipitation of the copolymer solution into methanol as described above.

TABLE 2

Material Amounts for Preparative Examples 2-4

| Raw Material (g) | Example 2 | Example 3 | Example 4 |
|---|---|---|---|
| MPP/DMP (mole ratio) | 20/80 | 50/50 | 80/20 |
| CAT | 17.3 | 21.6 | 17.3 |
| DBEDA | 5.3 | 6.7 | 5.3 |
| DBA | 9.9 | 9.9 | 9.9 |
| DMBA | 34.3 | 33.3 | 32.5 |
| QUAT | 1.6 | 2.0 | 1.6 |
| DMP/TOLUENE 50/50 | 29.5 | 18.5 | 5.5 |
| TOLUENE | 2961.0 | 2961.0 | 2961.0 |
| MPP | 5.6 | 14.0 | 16.0 |
| Continuous Feed Solution | | | |
| DMP/TOLUENE 50/50 | 364.5 | 228 | 64 |
| MPP | 69.4 | 172 | 197 |
| Total | 3498.36 | 3466.925 | 3310.08 |

The dried copolymers were characterized for molecular weight distribution via gel permeation chromatography (GPC) using $CHCl_3$ as solvent and referenced to polystyrene standards. Intrinsic viscosity (IV) was measured in $CHCl_3$ solution at 25° C., using an Ubbelohde viscometer, and is expressed in units of deciliters per gram (dL/g). The glass transition temperature Tg was measured using differential scanning calorimetry (DSC) and expressed in ° C. The results for examples 1-4 are summarized in Table 3. "Mn" refers to number average molecular weight, "Mw" refers to weight average molecular weight, "D" refers to polydispersity, and "g" refers to grams.

TABLE 3

Characterization of MPP-DMP Copolymers of Preparative Examples 1-4

| Ex. No. | Scale | MPP/DMP (mole/mole) | GPC Mn (g/mole) | GPC Mw (g/mole) | GPC D (Mw/Mn) | IV in $CHCl_3$ (dL/g) | Tg ° C. |
|---|---|---|---|---|---|---|---|
| 1 | 1.8 liter | 50/50 | 20,213 | 219,130 | 10.8 | 0.83 | 185 |
| 2 | 1 gallon | 20/80 | 50,310 | 172,100 | 3.4 | 1.04 | 210 |
| 3 | 1 gallon | 50/50 | 39,820 | 194,900 | 4.9 | 0.97 | 187 |
| 4 | 1 gallon | 80/20 | 22,620 | 241,000 | 10.7 | 0.96 | 177 |

Examples 5-10: General Procedure for Casting Membranes Via Solvent/Non-Solvent Phase Inversion Process In general, porous asymmetric membranes were cast by dissolving MPP-DMP copolymers and amphiphilic block copolymers comprising a poly(phenylene ether) block or a poly(phenylene ether) copolymer block and a hydrophilic block or graft in N-methyl-2-pyrrolidone (NMP) at concentrations of about 16 wt. % and about 1 to 10 wt. %, respectively; pouring the viscous casting solution onto a glass plate and drawing a thin film 150-250 micrometers thick across the plate by means of a casting knife. The glass plate bearing the thin film of MPP-DMP in NMP was placed into a primary coagulation bath over a time period of 10-15 minutes. The primary coagulation bath was a mixture of NMP and water, and promoted the precipitation and coagulation of the copolymer into an asymmetric porous membrane. The coagulated copolymer film floated free of the glass plate when coagulation was substantially complete, at which time it was transferred to a second bath in which it was soaked and rinsed in clean water to remove residual NMP.

The process is described in more detail as follows. MPP-DMP copolymers and amphiphilic block copolymers comprising a poly(phenylene ether) block or a poly(phenylene ether) copolymer block and a hydrophilic block or graft were dissolved in NMP, chromatography grade, totaling 8-10 grams in a 20-milliliter (mL) glass vial, sealed tightly, and placed on a low speed roller for 13-48 hours until it forms a homogenous solution. The solution was poured in an oblong puddle and an adjustable height doctor blade was used to drag across the glass plate at a constant speed by hand. The entire glass plate bearing the cast copolymer solution was fully submerged into an initial non-solvent bath (10-100 wt. % DI water in NMP) until the membrane begins to lift off the plate. The membrane was transferred off of the glass plate into the intermediate non-solvent bath of 100 wt. % DI water and weighed down at the corners with glass stoppers to allow the exchange of NMP into the water bath. After 15-45 minutes the membrane was transferred to a final non-solvent bath of 100 wt. % water to fully solvent exchange the pores overnight, also weighed down to submerge fully. The membrane was dried at room temperature. Characterization was performed on pieces cut from the center and most uniform portion of the membrane. The viscosity of the copolymer solutions in NMP was measured at 20° C. using a Brookfield RDV-II Pro viscometer equipped with a small-sample adapter and cylindrical spindle.

Characterization of Membranes

A simple estimate of the water flow through the membranes was made by cutting a 47-millimeter (mm) circle of the membrane and placing it on a flitted funnel and clamped. The vacuum filter flask was tared on a balance then 100 g of water was added to the flitted funnel and one atmosphere vacuum was applied for 15-60 min. (minutes). All data were normalized to a 60-min. run time. The water flow was calculated by placing the vacuum filter flask on the tared balance and recording the value.

The surface porosities and cross-sectional morphologies of the membranes were characterized using Carl Zeiss Supra VP scanning electron microscopy (SEM). The "top" membrane surfaces (those that were first in contact with the NMP/water bath) were imaged for selective surface morphology. The membrane samples were coated with ~0.3 nm Pt/Pd target using Cressington 208 high resolution sputter coater equipped with thickness controller MTM-20. The surface morphology was imaged using low voltage capability (≤5 kV, probe current 200 nA and inlens surface sensitive detection mode at 100,000× magnifications. A minimum of 3 images were combined for digital image analysis using Clemex Vision PE 6.0.035 software to estimate the pore size distributions and pooled for the analysis. Samples for cross-sectional imaging were soaked in ethanol for 5 minutes and cryo-fractured using liquid nitrogen, then allowed to come to room temperature and dried in air. The cryo-fractured membrane samples were coated with Pt/Pd target and imaged using SEM for cross sectional morphology.

The interaction of the membrane surfaces with water was quantified via measurement of contact angle using a Kruss DA-25 drop shape analysis system. A small square section of membrane was cut out from the center of the membrane, and mounted on a glass microscope slide using double sided tape. A 2-microliter water droplet was deposited on the surface and the drop shape was measured using digital curve fitting 5 times with a 1 second spacing and the resulting contact angles of the water droplet with the membrane surface were averaged together.

Examples 9-10: Membranes Cast from 20/80 MPP-DMP Copolymer with PS-PEO Diblock Copolymer A sample of an amphiphilic block diblock copolymer was obtained from Sigma-Aldrich, which is described in their catalog as being comprised of a block of polystyrene (PS) having an Mn of about 30,000 g/mole, which has been coupled to a block of poly(ethylene oxide) (POE) of Mn of about 1,000 g/mole. From this description we conclude that this PS/PEO block copolymer contains only about 3 wt. % of hydrophilic block by weight. Poly(phenylene ether) copolymers were prepared by copolymerization of 2-methyl-6-phenylphenol (MPP) and 2,6-dimethylphenol (DMP). As used herein, poly(phenylene ether) comonomer ratios are mole ratios. In Examples 9 and 10, solutions containing 16 wt. % of a 20/80 MPP-DMP copolymer (Example 2) were prepared in the presence of 2 and 4 wt. % of the PS/PEO diblock copolymer, respectively, and cast into membranes following the same procedures as described above. The results of SEM image analysis of these membranes are presented in FIG. 1. The surface appearance of the membranes characterized by SEM were found to be very similar to that of Example 6 which was prepared by casting the MPP-DMP copolymer alone.

The blends of Examples 9-10 containing PS/PEO copolymer yielded membrane surfaces upon phase-inversion casting which had pore size distributions that showed as good or better consistency in pore size distribution as seen for Example 6, which was made from MPP-DMP copolymer alone (Table 6). From this we can conclude that the presence of short blocks of PS has not substantially disrupted the inherently good membrane-forming characteristics of the MPP-DMP copolymer. The contact angle of the membranes containing the PS-PEO diblock as additive show a slight trend towards reduced contact angle, and a decrease in Tg which most likely results from forming a miscible blend between the MPP-DMP copolymer and the PS blocks. It is expected that this type of additive will not be soluble in NMP/water, contrary to PVP, and so it would be expected to be present in the membrane itself

TABLE 6

Properties of Membranes Made from Blends of MPP-DMP Copolymer and PS/PEO Diblock Copolymer

| Ex. No. | Wt % Resin In NMP Casting Dope | Surface Pore Size Distribution of Membrane (μm) | Membrane Tg (° C.) |
| --- | --- | --- | --- |
| 6 | 16% Ex. 2 | 12.2 ± 3.8 | 210 |
| 9 | 16% Ex. 2 + 2% PS-PEO | 10.1 ± 2.0 | 183 |
| 10 | 16% Ex. 2 + 4% PS-PEO | 9.2 ± 1.7 | 176 |

Given the low level of PEO in the sample of PS/PEO diblock copolymer that was commercially available, it is not surprising that the contact angle of the membranes was only slightly reduced in the resulting blended membrane. In Examples 9 and 10, the PS-PEO block copolymer can be replaced with an amphiphilic block copolymer, comprising a poly(phenylene ether) block or a poly(phenylene ether) copolymer block and a hydrophilic block or graft.

Preparative Examples 11-13: Preparation of MPP-DMP Copolymers with 20, 50, and 80 Mole Percent MPP MPP-DMP copolymers with 20, 50, and 80 mole % MPP were prepared in a 1-gallon reactor using the same methods as in Preparative Examples 2-4. The dried copolymers were characterized for molecular weight distribution as described above for Preparative Examples 2-4. The results for Preparative Examples 11-13 are summarized in Table 7. "Mn" refers to number average molecular weight, "Mw" refers to weight average molecular weight, "D" refers to polydispersity, and "g" refers to grams.

TABLE 7

Characterization of MPP-DMP Copolymers of Preparative Examples 11-13

| Ex. No. | MPP/DMP (mole/mole) | GPC Mn (g/mole) | GPC Mw (g/mole) | GPC D (Mw/Mn) | IV in CHCl$_3$ (dL/g) |
| --- | --- | --- | --- | --- | --- |
| 11 | 20/80 | 63,010 | 210,800 | 3.3 | 1.14 |
| 11a | 20/80 | 49,940 | 199,700 | 4.0 | 1.08 |
| 12 | 50/50 | 42,460 | 216,200 | 5.1 | 0.98 |
| 13 | 80/20 | 36,490 | 310,700 | 8.5 | 1.08 |

Exs. 18-20 and Comparative Ex. 3: Hollow Fiber Spinning Trials

The membrane-forming compositions (NMP casting dopes) of Examples 14-16, (containing the MPP-DMP copolymers of Examples 11-13, respectively) and Comparative Example 2 were processed into hollow fiber membranes according to the methods disclosed in the '848 application. ULTRASON™ 6020P (BASF) was maintained for 24 hrs. under vacuum prior to mixing to remove all moisture. The chemicals were mixed until a homogenous solution was reached. Before filling the spinning solution into the spinning set up, the composition was filtered through a 25-μm metal mesh to remove any residual particles in the composition. The spinning solution was degassed for 24 hrs. before the spinning. For all spinnings, a bore solution of 70 wt % deionized water and 30 wt % NMP was prepared and was degassed for 24 hrs. before use.

Figure 2:
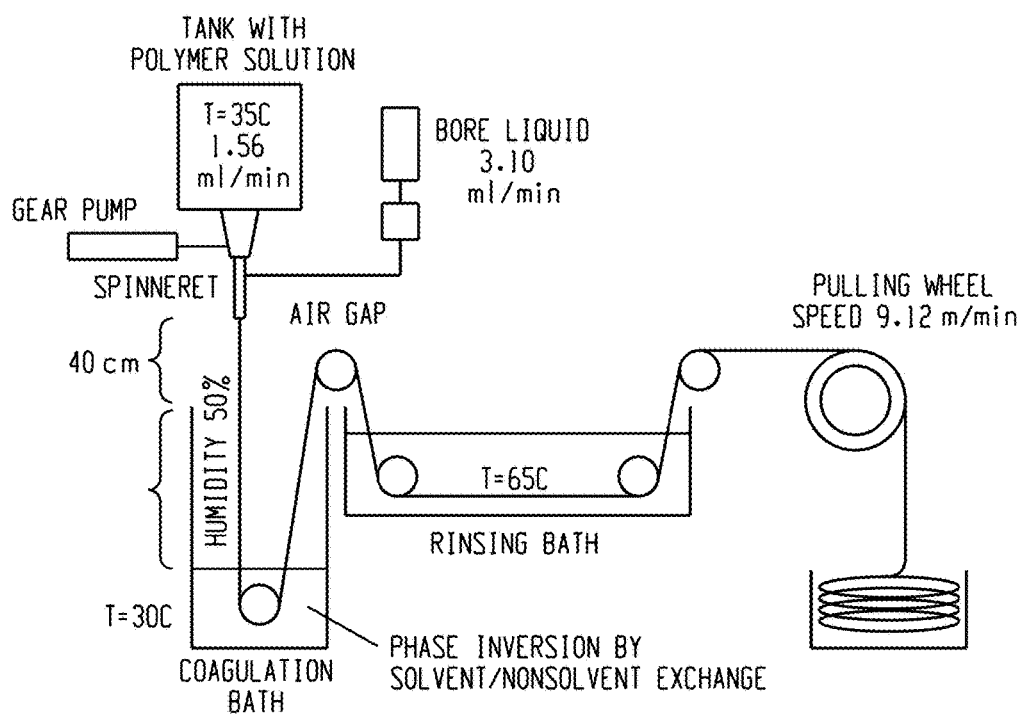
FIG. 2 is a diagram of a laboratory scale, dry-wet immersion precipitation spinning apparatus.
Figure 3:
FIG. 3 shows laboratory-scale hollow fiber membrane modules.

Hollow fiber membranes of PES and PVP (Comparative Example 3) were prepared on a laboratory scale by dry-wet immersion precipitation spinning using the apparatus shown in the schematic of FIG. 2 and under conditions adapted from the '848 application. The copolymer solution along with the bore liquid were simultaneously pumped through a double orifice spinneret and after passing the air gap, immersed into the water coagulation bath. The take-up velocity was controlled by a pulling wheel, which enabled also stretching of the fiber. A solution of MPP-DMP copolymer according to Example 12 of 18% by weight in NMP was successfully spun into hollow PPE fibers to produce Example 18 using the same apparatus and the same conditions as used to prepare Comparative Example 3.

A summary of the fiber spinning conditions, spinneret geometry, and measured dimensions of the dried hollow fibers is shown in Table 10. For Comparative Example 3, the rinsing bath was held at 65° C. according to the example in the '848 application, which is understood to be for rinsing away excess PVP from the surface of the hollow fiber membrane. For Examples 18-20, which were prepared from the 20/80, 50/50, and 80/20 MPP-PPE copolymers, respectively, the rinsing bath was held at 30° C. for safety in handling the fibers and because there is no PVP to be washed away. The take-up velocity was adjusted such that the wall thickness of the two hollow fiber samples was in the range of 40-60 micrometers. The post treatment process for the hollow fiber produced was as described in the '848 application. The fibers were washed in 70° C. purified water for 3 hrs. After 1.5 h the water was exchanged. Afterwards the fibers were rinsed for another 24 hrs. in water at tap temperature. After the rinsing step, the fibers were hung in the lab to dry in air at ambient temperature.

Based on the finding that the membrane-forming polymer solution viscosity in NMP was very sensitive to the amount of MPP co-monomer in the copolymer, the concentration of each resin was adjusted so as to yield an essentially constant solution viscosity of just over 3,000 cP. As a result there is a direct correlation between the level of MPP co-monomer in the copolymer and the mass of PPE per unit length of fiber, with Example 18a demonstrating the most efficient use of resin under the same spinning conditions. The fiber wall thickness was also maintained to a greater extent in Ex. 19, suggesting that with further optimization of fiber spinning conditions to reduce the wall thickness, a greater reduction in mass per unit length can be realized.

TABLE 10

Summary of Process Conditions for Hollow Fiber Spinning and Fiber Properties

| | Example | | | |
| --- | --- | --- | --- | --- |
| | Comparative Example 3 | Ex. 18 | Ex. 19 | Ex. 20 |
| Wt % resin in NMP casting dope | 14% 6020P/ 5% K30/ 2% K90/ 3% H$_2$0 | 18% Ex. 12 | 14% Ex. 11 | 20% Ex. 13 |
| Viscosity (cP at 35° C.) | — | 3270 | 3091 | 3137 |
| Dope temp. [° C.] | 35 | 35 | 35 | 35 |
| Die temp. [° C.] | — | — | — | — |
| Shaft temp. [° C.] | ~22 | ~30 | ~30 | ~22 |
| Shaft humidity [%] | 50 | 60 | 60-65 | 60 |
| Room humidity [%] | 35 | 40 | 40 | 40 |
| 1$^{st}$ bath temp. [° C.] | 30 | 30 | 30 | 30 |
| 2$^{nd}$ bath temp. [° C.] | 65 | 30 | 30 | 30 |
| Air Gap [cm] | 100 | 100 | 100 | 100 |
| Dope extrusion rate [mL/min] | 1.56 | 1.56 | 1.56 | 1.56 |
| Bore extrusion rate [mL/min] | 3.1 | 3.1 | 3.1 | 3.1 |
| Take up velocity [m/min] | 9.12 | 7.04 | 7.07 | 7.00 |
| Spinneret dimensions | | | | |
| Inner diameter [mm] | 0.4 | 0.4 | 0.4 | 0.4 |
| Outer diameter [mm] | 1.12 | 1.12 | 1.12 | 1.12 |
| Dry hollow fiber dimensions by SEM | | | | |
| Inner diameter [μm] | 445 | 605 | 510 | 605 |
| Wall thickness [μm] | 59 | 41 | 47 | 23 |
| Mass per km (g) | 25.9 | 40.2 | 31.1 | 43.3 |

Preparation of Hollow Fiber Membrane Modules

Lab scale hollow fiber membrane modules as shown in FIG. 2 were prepared for the clean water flux and molecular weight cut off measurements as follows. 5-10 Fibers, depending on the geometry were guided through polypropylene tubes and the t-connections, which provide access to the outer surface of the hollow fibers. Both ends were sealed with hot glue. After the glue hardened, the modules were carefully cut open at one or both ends to expose the inner core of the hollow fibers to make them ready to use. The membrane length was between 25 and 30 cm. The fibers of Ex. 20 were more brittle than the other fibers, and extra care was required to glue the fibers of Ex. 20 into the modules to avoid damaging the fibers.

Measurement of Clean Water Flux

Clean water flux (CWF) was measured as follows. A pump was connected to a mass flow controller and a pressure sensor. Behind the pressure sensor the membrane module was connected so that the filtration direction was inside-out, that is the water was forced into the bore side of the membrane and permeated through the membrane to the outside of the membrane. The filtration mode was dead end filtration, that is only one end of the filtration module was cut open and connected to the feed solution. The flow rate was set to 100 g/h and the feed pressure was recorded over time. After the pretreatment of the membrane modules, the experiment was run for 1 hr. to achieve steady state conditions. Prior to the measurement, all the hollow fibers were wetted with a mixture of 50 wt % water and 50 wt % ethanol. Afterwards clean water was permeated through the hollow fiber membranes for 15 minutes to remove all residual ethanol from the fibers. The measurement was started directly after the pretreatment.

Measurement of Molecular Weight Cut-Off

Prior to the measurement of the molecular weight cut-off (MWCO), all membrane modules were wetted with a mixture of 50 wt % water and 50 wt % ethanol. Next, clean water was permeated through the hollow fiber membranes for 15 minutes to remove all residual ethanol from the fibers. The measurement was started directly after the pretreatment.

FIG. 5 shows a schematic drawing of the MWCO measurement apparatus. Both ends of the hollow fiber filtration modules shown in FIG. 4 were cut and the feed solution was pumped through the inside of the hollow fibers and the retentate recirculated to the feed tank. The permeate solution is circulated across the outside of the fibers via the T-connectors and recycled to a separate feed tank. The cross flow velocity was controlled via the pump and the feed, retentate, and pressure are recorded. The permeate pressure was at ambient pressure. A valve at the retentate side can optionally be used to control the retentate pressure.

A turbulent flow inside the hollow fiber is desirable in order to prevent concentration polarization during the experiment. To provide turbulent flow, the cross flow velocity is set to target a Reynolds number of about 3000. The Reynolds number is defined according to Equation 1, whereas "η" is defined as the dynamic viscosity of the fluid, "ρ" is defined as the density of the fluid, "v" defined as the fluid velocity and "d" defined as the inner fiber diameter.

$$Re = \frac{\rho * v * d}{\eta} \quad \text{(Eq. 1)}$$

As a feed solution, a mixture of four different dextrans, which differ in molecular weight (1 kDa, 4 kDa, 8 kDa and 40 kDa), was used. The concentration in the feed solution was 0.5 g/L for each dextran. The molecular weight cut off is defined as that molecular weight of a species which is retained up to 90 percent by the membrane. The retention is calculated by comparing the gel permeation chromatography of the initial solution of dextrans to that measured on permeate and retentate solutions after reaching equilibrium.

Example 19: Preparation of Membranes

Following the procedure described above, membranes are cast from dope solutions of the 50/50 MPP-DMP copolymer of Example 12 (12 to 20 wt %) in combination with the amphiphilic polymers described herein (1 to 10 wt %) in NMP to form asymmetric membranes. The temperature was maintained at 35° C. throughout the casting and initial phase-inversion coagulation process. The vials of polymer solutions in NMP are equilibrated for several hours in a milled aluminum "dry block" which was controlled at 35.0±0.1° C. by use of an electric heater. The glass casting plates and casting knife are equilibrated for several hours atop an electrically-heated hot plate at 35.0±0.1° C. before use. The NMP/water coagulation solution of 2 liters is contained in a digitally-controlled thermostat bath at 35.0±0.1° C. Additionally the viscosity of the polymer solutions in NMP is measured using a Brookfield LVDV3T viscometer equipped with a cone & plate measuring heat and circulating water bath, controlled to within 0.1° C. of the desired temperature.

Example 20: Hollow Fiber Spinning

An amphiphilic polymer as described herein in combination with a hydrophobic polymer of Example 17 in a weight ratio of 12% to 20% are processed into hollow fiber membranes according to the methods described in Example 18 and Comparative Example 3. Hollow fiber membrane modules are prepare as described above, and water flux measured. The fibers can provide a CWF of about 10 to about 80 (L/(h*m$^2$*bar), or about 20 to about 80 L/(h·m$^2$·bar), or about 40 to about 60 L/(h·m$^2$·bar).

As used herein, comprising is inclusive of "consisting essentially of" and "consisting of." The use of the terms "a" and "an" and "the" and similar referents in the context of describing the invention (especially in the context of the following claims) is to be construed to cover both the singular and the plural, unless otherwise indicated herein or clearly contradicted by context. "Or" means "and/or." The endpoints of all ranges directed to the same component or property are inclusive and independently combinable. All ranges disclosed herein are inclusive of the endpoints, and the endpoints are independently combinable with each other. The terms "first" and "second" and the like, do not denote any order, quantity, or importance, but are only used to distinguish one element from another.

As used herein, the term "hydrocarbyl" refers broadly to a moiety having an open valence, comprising carbon and hydrogen, optionally with 1 to 3 heteroatoms, for example, oxygen, nitrogen, halogen, silicon, sulfur, or a combination thereof. Unless indicated otherwise, the hydrocarbyl group can be unsubstituted or substituted, provided that the substitution does not significantly adversely affect synthesis, stability, or use of the compound. The term "substituted" as used herein means that at least one hydrogen on a hydrocarbyl group is replaced with a nitrogen, oxygen, sulfur, halogen, silicon, or a combination thereof, provided that the normal valence of any atom is not exceeded. For example, when the substituent is oxo (i.e. "═O"), then two hydrogens on a designated atom are replaced by the oxo group. Combinations of substituents and/or variables are permissible provided that the substitutions do not significantly adversely affect the synthesis, stability or use of the compound.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. An amphiphilic block copolymer, comprising
a hydrophobic block comprising a poly(phenylene ether) block or a poly(phenylene ether) copolymer block having repeat units of the structure:

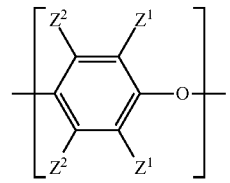

wherein each occurrence of $Z_1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z_2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and
a hydrophilic block or graft comprising a polymerized hydrophilic ethylenically unsaturated monomer.

2. The amphiphilic block copolymer of claim 1, comprising 20 to 50 weight percent of the hydrophobic block and 50 to 80 weight percent of the hydrophilic block or graft.

3. The amphiphilic block copolymer of claim 1, wherein the hydrophobic block comprises a poly(phenylene ether) copolymer comprising:
100 to 20 mole percent repeat units derived from 2,6-dimethylphenol; and
0 to 80 mole percent repeat units derived from a second monohydric phenol having the structure

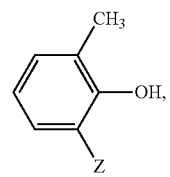

wherein Z is $C_{1-12}$ alkyl or cycloalkyl, or a monovalent group having the structure

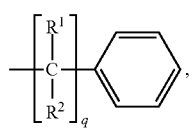

wherein q is 0 or 1 and $R^1$ and $R_2$ are independently hydrogen or $C_{1-6}$ alkyl;

wherein all mole percents are based on the total moles of all repeat units; and wherein the poly(phenylene ether) copolymer block has an intrinsic viscosity of 0.1 to 0.5 deciliters per gram, measured in chloroform at 25° C.

4. The amphiphilic block copolymer of claim 1, wherein the hydrophobic block of the amphiphilic copolymer comprises a poly(phenylene ether) copolymer comprising:
80 to 20 mole percent repeat units derived from 2,6-dimethylphenol; and
20 to 80 mole percent repeat units derived from the second monohydric phenol.

5. The amphiphilic block copolymer of claim 4, wherein the second monohydric phenol comprises 2-methyl-6-phenylphenol.

6. The amphiphilic block copolymer of claim 1, wherein the hydrophilic ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing.

7. A method of making the amphiphilic block copolymer of claim 1, comprising polymerization of the hydrophilic ethylenically unsaturated monomer in the presence of a hydrophobic polymer comprising a poly(phenylene ether) or a poly(phenylene ether) copolymer having repeat units of the structure:

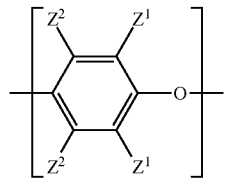

wherein each occurrence of $Z_1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z_2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

8. The method of claim 7, wherein the polymerization is controlled radical polymerization.

9. The method of claim 8, wherein the controlled radical polymerization is atom transfer radical polymerization, reversible addition fragmentation transfer polymerization, or stable free radical polymerization.

10. The method of claim 7, wherein the polymerization is graft polymerization.

11. The method of claim 7, wherein the hydrophilic ethylenically unsaturated monomer comprises methoxy-capped poly(ethylene oxide) methacrylate, 4-vinylpyridine, vinyl pyrrolidone, N,N-dimethylacrylamide, 4-acryloylmorpholine, or a combination comprising at least one of the foregoing.

12. A porous asymmetric membrane comprising:
a hydrophobic polymer comprising a poly(phenylene ether) or poly(phenylene ether) copolymer; and
an amphiphilic block copolymer comprising
an amphiphilic block copolymer comprising
a hydrophobic block comprising a poly(phenylene ether) or poly(phenylene ether) copolymer having repeat units of the structure:

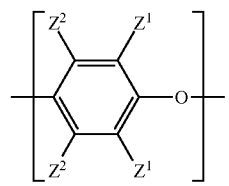

wherein each occurrence of $Z_1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z_2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, and
a hydrophilic block or graft comprising a polymerized hydrophilic ethylenically unsaturated monomer,
in a water-miscible polar aprotic solvent to form a porous asymmetric membrane-forming composition;
phase-inverting the porous asymmetric membrane forming-composition in a first non-solvent to form the porous asymmetric membrane;
optionally washing the porous asymmetric membrane in a second non-solvent; and
optionally drying the porous asymmetric membrane to form the porous asymmetric membrane.

13. A porous asymmetric membrane-forming composition comprising:
a hydrophobic polymer comprising a poly(phenylene ether) or poly(phenylene ether) copolymer;
the amphiphilic block copolymer of claim 1; and
a water-miscible polar aprotic solvent,
wherein the hydrophobic polymer and amphiphilic block copolymer are dissolved in the water-miscible polar aprotic solvent.

14. A method of forming a porous asymmetric membrane, the method comprising:
dissolving
a hydrophobic polymer comprising a poly(phenylene ether) or poly(phenylene ether) copolymer and
wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

15. The porous asymmetric membrane of claim 12, wherein the hydrophobic polymer comprises a poly(phenylene ether) having repeat units having the structure:

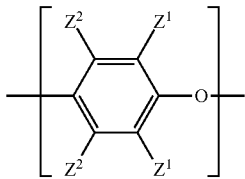

a hydrophobic block comprising a poly(phenylene ether) block or a poly(phenylene ether) copolymer block having repeat units of the structure:

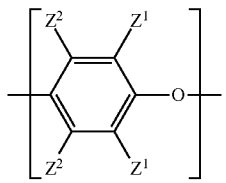

wherein each occurrence of $Z_1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z_2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and a hydrophilic block or graft comprising a polymerized hydrophilic ethylenically unsaturated monomer.

16. The porous asymmetric membrane of claim 12, wherein the hydrophobic polymer comprises a poly(phenylene ether) copolymer comprising:

100 to 20 mole percent repeat units derived from 2,6-dimethylphenol; and 0 to 80 mole percent repeat units derived from a second monohydric phenol having the structure

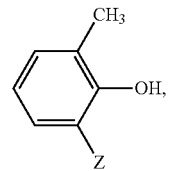

wherein Z is $C_{1-12}$ alkyl or cycloalkyl, or a monovalent radical having the structure

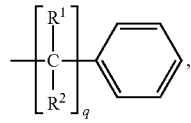

wherein q is 0 or 1, and $R^1$ and $R^2$ are independently hydrogen or $C_{1-6}$ alkyl;

wherein the mole percents are based on the total moles of all repeat units; and wherein the poly(phenylene ether) copolymer has an intrinsic viscosity of 0.7 to 1.5 deciliters per gram, measured in chloroform at 25° C.

17. The porous asymmetric membrane of claim 12, wherein the hydrophobic polymer comprises a poly(phenylene ether) copolymer comprising: 80 to 20 mole percent repeat units derived from 2,6-dimethylphenol; and 20 to 80 mole percent repeat units derived from the second monohydric phenol.

18. The porous asymmetric membrane of claim 17, wherein the second monohydric phenol comprises 2-methyl-6-phenylphenol.

19. The amphiphilic block copolymer of claim 1, wherein the hydrophobic block of the amphiphilic copolymer comprises the poly(phenylene ether) copolymer block.

20. The porous asymmetric copolymer of claim 12, wherein the hydrophobic block of the amphiphilic copolymer comprises the poly(phenylene ether) copolymer block.

21. A method of making the amphiphilic block copolymer of claim 14, wherein the hydrophobic block of the amphiphilic copolymer comprises the poly(phenylene ether) copolymer block.

* * * * *